(12) United States Patent
Bellinger et al.

(10) Patent No.: US 6,567,734 B2
(45) Date of Patent: May 20, 2003

(54) SYSTEM AND METHOD FOR ESTIMATING VEHICLE MASS

(75) Inventors: Steven M. Bellinger, Columbus, IN (US); John F. Kalill, Columbus, IN (US); Brian C. Tyler, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 6 days.

(21) Appl. No.: 09/935,523

(22) Filed: Aug. 23, 2001

(65) Prior Publication Data

US 2003/0040861 A1 Feb. 27, 2003

(51) Int. Cl.[7] .............................. G06F 17/00; B60T 8/32
(52) U.S. Cl. ........................ 701/51; 701/124; 702/173
(58) Field of Search .......................... 701/51, 124, 1, 701/29; 702/173, 175; 477/120

(56) References Cited

U.S. PATENT DOCUMENTS

| | | | | |
|---|---|---|---|---|
| 4,656,876 A | * | 4/1987 | Fremd ........................ 73/865 |
| 5,482,359 A | * | 1/1996 | Breen ........................ 303/9.69 |
| 5,487,005 A | * | 1/1996 | Genise ........................ 701/36 |
| 5,510,982 A | * | 4/1996 | Ohnishi et al. ................ 701/55 |
| 6,144,928 A | * | 11/2000 | Leimbach et al. ........... 702/173 |
| 6,314,383 B1 | * | 11/2001 | Leimbach et al. ........... 702/173 |
| 6,347,269 B1 | * | 2/2002 | Hayakawa et al. ........... 701/51 |

* cited by examiner

*Primary Examiner*—Tan Q. Nguyen
(74) *Attorney, Agent, or Firm*—Barnes & Thornburg

(57) ABSTRACT

A system for estimating vehicle mass includes a control circuit determining an instantaneous vehicle acceleration signal (VA) and an instantaneous vehicle drive force ($F_{DW}$). As long as a number of preconditions are met, such as vehicle speed within speed range, fueling command above a fueling threshold, gear ratio within a predefined range and VA above an acceleration threshold, the control circuit computes a number of instantaneous vehicle mass estimates (VM) as a function of the VA and $F_{DW}$ values. When any one of the preconditions is no longer met, the control circuit computes a vehicle speed change during the next gear shift and disregards the number of vehicle mass estimates if this vehicle speed change is outside predefined boundaries. Otherwise, the control computer processes the number of vehicle mass estimates to form an updated vehicle mass estimate.

94 Claims, 8 Drawing Sheets

SYSTEM AND METHOD FOR ESTIMATING VEHICLE MASS

FIELD OF THE INVENTION

The present invention relates generally to systems for estimating the mass of a vehicle carrying an internal combustion engine, and more specifically to such systems operable to dynamically estimate vehicle mass based on engine/vehicle operating conditions.

BACKGROUND OF THE INVENTION

Systems for estimating vehicle mass or weight are known and typically used in medium and heavy duty truck applications wherein such information is useful for optimizing any of a number of engine and/or transmission operating conditions. One particular class of such systems makes use of Newton's second law of motion by estimating mass in accordance with an equation of the form m=F/A, where m is the mass of the vehicle, F is the vehicle driving force and A is the vehicle acceleration.

Unfortunately, known systems for estimating vehicle mass based on the foregoing equation have a number of drawbacks associated therewith. For example, the vehicle driving force, F, is oftentimes determined in known systems as a rough estimation of the actual driving force of the vehicle that occurs at the vehicle wheels. Many force factors, both additive and resistive, contribute to the actual driving force seen at the vehicle wheels, and the use of inaccurate vehicle driving force values may lead to gross errors in the estimated vehicle mass values.

As another example, known systems for estimating vehicle mass generally fail to optimize conditions under which vehicle driving force and vehicle acceleration data is sampled, resulting in non-linearities and other data measurement inaccuracies. As a specific example, driveline windup effects at the onset of a vehicle acceleration event can contribute to inaccurate driving force and acceleration measurements, although known vehicle mass estimating systems typically do not compensate for such effects. As another specific example, while most known vehicle mass estimating systems require certain operating conditions to be satisfied prior to computing mass estimate values, e.g., vehicle acceleration above an acceleration threshold, transmission gear engaged, etc., such systems generally fall short in providing for optimal operating conditions for computing such estimates.

As yet another example, known systems for estimating vehicle mass are generally operable to compute vehicle mass estimates upon satisfaction of certain operating conditions as just described, but fail to either discontinue computing or disregard such estimates under operating conditions that may grossly corrupt the data. For example, any of a number of typically unaccounted for environmental factors may impart forces, either additive or resistive, on the vehicle that may at the very least corrupt the estimated mass values, and more often render such estimated values highly inaccurate. As a specific example, road grade conditions greater than only a few percent or less, wind conditions, road surface conditions, and the like, can each contribute to vehicle mass estimates that so remote from the true vehicle mass so as to render such estimates unusable.

Unfortunately, known vehicle mass estimating systems typically include such highly inaccurate estimates in their vehicle mass computations, and as a result must employ filtering techniques designed to minimize the impact of such poor estimates on final or running mass estimate values. One popular filtering technique is to maintain as a vehicle mass estimate the running average of several tens, hundreds or thousands of individual vehicle mass estimate values in hopes that this running average will "absorb" poor estimates and more closely reflect the true vehicle mass. However, this approach is generally undesirable, particularly in systems that require a responsive indication of instantaneous vehicle mass changes, such as when an operator either drops or picks up a trailer and/or loads or unloads cargo. With known vehicle mass estimating systems of the type just described, the running vehicle mass average value will generally not provide such a responsive indication of instantaneous mass changes, but will instead provide only a gradual indication over an extended time period.

What is therefore needed is an improved system for estimating vehicle mass that provides accurate vehicle mass information and that is highly responsive to instantaneous changes in actual vehicle mass.

SUMMARY OF THE INVENTION

The foregoing shortcomings of the prior art are addressed by the present invention. In accordance with one aspect of the present invention, a system for estimating vehicle mass comprises a speed sensor producing a vehicle speed signal indicative of road speed of a vehicle carrying an internal combustion engine having a transmission coupled thereto, means for determining a gear ratio of the transmission, and a control circuit determining a vehicle driving force, computing a vehicle acceleration as a function of the vehicle speed signal and estimating a mass of the vehicle as a function of the vehicle driving force and the vehicle acceleration only if the gear ratio is between predefined high and low gear ratio values.

In accordance with another aspect of the present invention, a method of estimating vehicle mass comprises determining a road speed of a vehicle carrying an internal combustion engine coupled to a transmission, determining a gear ratio of the transmission, determining a vehicle driving force, computing a vehicle acceleration value as a function of the road speed, and estimating a mass of the vehicle as a function of the vehicle driving force and the vehicle acceleration value only if the gear ratio is between first and second predefined gear ratio values.

In accordance with yet another aspect of the present invention, a system for estimating vehicle mass comprises a first sensor producing a vehicle speed signal indicative of road speed of a vehicle carrying an internal combustion engine, a second sensor producing an engine speed signal indicative of rotational speed of the engine, a fuel system responsive to a fueling signal to supply fuel to the engine, and a control circuit producing the fueling signal and computing an engine driving force as a function thereof, the control circuit responsive to the engine speed signal to determine a first resistance force associated with at least one accessory driven by the engine and to compute a net driving force as a function of the engine driving force and the first resistance force, the control circuit determining a vehicle acceleration value as a function of the vehicle speed signal and estimating a mass of the vehicle as a function of the vehicle acceleration value and the net driving force.

In accordance with still another aspect of the present invention, a method of estimating vehicle mass comprises determining a road speed of a vehicle carrying an internal combustion engine, determining a rotational speed of the engine, computing a vehicle acceleration value as a function of the road speed, determining an engine driving force, determining a first resistance force as a function of the rotational speed, the first resistance force corresponding to a force required to overcome a load resistance of at least one accessory driven by the engine, computing a net driving force as a function of the engine driving force and the first resistance force, and estimating a mass of the vehicle as a function of the vehicle acceleration value and the net driving force.

In accordance with a further aspect of the present invention, a system for estimating vehicle mass comprises a speed sensor producing a vehicle speed signal indicative of road speed of a vehicle carrying an internal combustion engine, and a control circuit responsive to the vehicle speed signal to compute a vehicle acceleration value, the control circuit responsive to the vehicle acceleration value exceeding an acceleration threshold to execute a data collection sequence by periodically computing instantaneous vehicle mass values as functions of instantaneous vehicle driving force and vehicle acceleration value pairs, and to the vehicle acceleration value dropping below the acceleration threshold to terminate the data collection sequence, the control circuit estimating a vehicle mass value as a function of only instantaneous vehicle mass values computed near termination of the data collection sequence.

In accordance with yet a further aspect of the present invention, a method of estimating vehicle mass comprises determining a road speed of a vehicle carrying an internal combustion engine, computing a vehicle acceleration value as a function of the road speed, executing a data collection sequence by periodically computing instantaneous vehicle mass values as functions of instantaneous vehicle driving force and vehicle acceleration pairs if the vehicle acceleration value exceeds a vehicle acceleration threshold, terminating the data collection sequence if the vehicle acceleration value drops below the vehicle acceleration threshold, and estimating a vehicle mass value as a function of only a subset of the instantaneous vehicle mass values computed near termination of the data collection sequence.

In accordance with still a further aspect of the present invention, a system for estimating vehicle mass comprises a sensor producing a vehicle speed signal indicative of road speed of a vehicle carrying an internal combustion engine having a transmission coupled thereto, and a control circuit determining a vehicle driving force, computing a vehicle acceleration as a function of the vehicle speed signal and computing an instantaneous vehicle mass value as a function of the vehicle driving force and the vehicle acceleration, the control circuit monitoring the vehicle speed signal and the transmission and estimating a vehicle mass value as a function of the instantaneous vehicle mass value only if the road speed changes less than a road speed change amount during a subsequent transmission gear shift.

In accordance with another aspect of the present invention, a method of estimating vehicle mass comprises sensing road speed of a vehicle carrying an internal combustion engine having a transmission coupled thereto, determining a vehicle driving force, computing a vehicle acceleration value as a function of the road speed, computing an instantaneous vehicle mass value as a function of the vehicle driving force and the vehicle acceleration value, monitoring the road speed during a gear shift of the transmission subsequent to computing the instantaneous vehicle mass value, and estimating a vehicle mass value as a function of the instantaneous vehicle mass value if the road speed changes less than a road speed change amount during the gear shift.

In accordance with still another aspect of the present invention, a system for estimating vehicle mass comprises a speed sensor producing a vehicle speed signal indicative of a road speed of a vehicle carrying an internal combustion engine, and a control circuit determining a vehicle driving force, computing a vehicle acceleration as a function of the vehicle speed signal and estimating a vehicle mass value as a function of the vehicle driving force and the vehicle acceleration, the control circuit combining the vehicle mass value with an existing vehicle mass estimate if a difference therebetween is less than a difference value.

In accordance with still a further aspect of the present invention, a method of estimating vehicle mass comprises sensing a plurality of road speed values of a vehicle carrying an internal combustion engine, computing a corresponding plurality of vehicle acceleration values as functions of the plurality of road speed values, determining a corresponding plurality of vehicle drive force values, estimating a corresponding plurality of vehicle mass values as functions of the plurality of vehicle acceleration and vehicle drive force values, comparing the plurality of vehicle mass values with an existing vehicle mass estimate, and combining the plurality of vehicle mass values with the existing vehicle mass estimate if differences between at least a consecutive number of the plurality of vehicle mass values and the existing vehicle mass estimate are less than a difference value.

One object of the present invention is to provide a system and method for estimating vehicle mass that overcomes drawbacks associated with known vehicle mass estimating systems.

Another object of the present invention is to provide such a system operable to estimate vehicle mass according to the general equation m=F/A, where m is the vehicle mass, F is the vehicle driving force and A is the vehicle acceleration.

Still another object of the present invention is to provide such a system operable to estimate vehicle mass only when certain engine/vehicle operating conditions are met.

Still another object of the present invention is to provide such a system operable to estimate vehicle mass only when an environmental resistance parameter indicative of environmental forces acting on the vehicle (e.g., road grade, wind, etc.), is within prescribed limits.

Yet another object of the present invention is to provide such a system operable to sample vehicle driving force and vehicle acceleration information in a region of vehicle acceleration that minimizes elastic and other driveline effects on such information.

These and other objects of the present invention will become more apparent from the following description of the preferred embodiment.

DESCRIPTION OF THE PREFERRED EMBODIMENT

Figure 1:
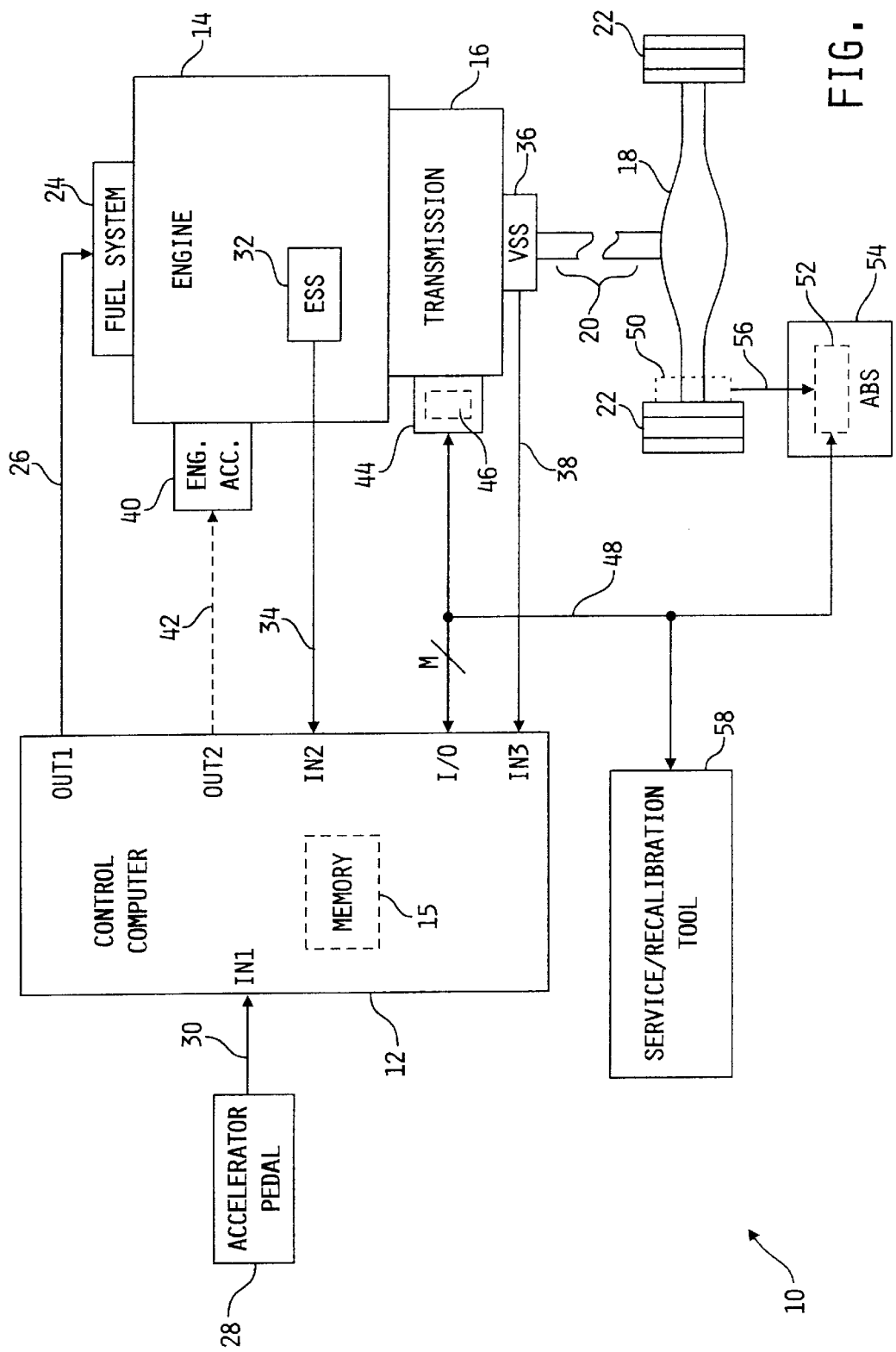
FIG. 1 is a diagrammatic illustration of one preferred embodiment of a system for estimating vehicle mass, in accordance with the present invention.

For the purposes of promoting an understanding of the principles of the invention, reference will now be made to a preferred embodiment illustrated in the drawings and specific language will be used to describe the same. It will nevertheless be understood that no limitation of the scope of the invention is thereby intended, such alterations and further modifications in the illustrated embodiment, and such further applications of the principles of the invention as illustrated therein being contemplated as would normally occur to one skilled in the art to which the invention relates.

Referring now to FIG. 1, one preferred embodiment of a system 10 for estimating vehicle mass, in accordance with the present invention, is shown. Central to system 10 is a control computer 12 that is preferably microprocessor-based and includes a memory unit 15, a number of digital inputs/outputs and a number of analog-to-digital (A/D) inputs/outputs. Control computer 12 is configured to execute a number of software algorithms, and is generally operable to control and manage the overall operation of an internal combustion engine 14. In this regard, control computer 12 is typically referred to as an electronic or engine control module or unit (ECM or ECU), although it is to be understood that control computer 12 may alternatively be any control circuit configured to operate as described herein. In any case, the memory unit 15 of control computer 12 may include RAM, ROM, EPROM, EEPROM, FLASH memory and/or any other memory known to those skilled in the art.

Internal combustion engine 14 is operatively connected to a transmission 16 that is, in turn, operatively connected to a drive or propeller shaft 20. The propeller shaft 20 is operatively connected to an axle 18 that is rotatably coupled to a number of vehicle wheels 22. The engine 14, transmission 16, propeller shaft 20, axle 18 and wheels 22 define a vehicle driveline drivetrain or powertrain operable to transfer driving force supplied by engine 14 to wheels 22 as is known in the art.

The engine 14 includes a fuel system 24 coupled thereto and electrically connected to output OUT1 of control computer 12 via signal path 26. An accelerator pedal 28, or other known throttle device, is electrically connected to an input IN1 of control computer 12, and is operable to provide a signal on signal path 30 indicative of accelerator pedal deflection or percentage. Control computer 12 is responsive to the accelerator pedal signal on signal path 30, as well as to a number of other engine/vehicle operating condition parameters, to determine an appropriate fueling command for fueling engine 14 in a manner known in the art. Control computer 12 is further operable to convert the fueling command to one or more fueling signals, as is known in the art, and to provide such one or more fueling signals to fuel system 24 via signal path 26. Fuel system 24 is, in turn, responsive to the one or more fueling signals provided thereto to correspondingly supply fuel to engine 14.

The engine 14 further includes one or more engine driven accessories, collectively represented in FIG. 1 as engine accessory 40, any one or more of which may be electrically connected to an output of control computer 12, such as to output OUT2 via signal path 42 as shown in phantom in FIG. 1. Examples of the one or more engine driven accessories 40 include, but are not limited to, an engine cooling fan, one or more air compressors, an in-cab air conditioning or cooling system, and the like.

System 10 further includes a number of sensors or sensing systems configured to provide control computer 12 with engine and/or vehicle operating information. For example, engine 14 includes an engine speed sensor 32 electrically connected to an input IN2 of control computer 12 via signal path 34. Sensor 32 is, in one preferred embodiment, a Hall effect sensor operable to sense passage thereby of a number of teeth formed on a rotating gear or tone wheel, although the present invention contemplates providing engine speed sensor 32 as any known rotational speed sensor including, for example, a variable reluctance sensor or the like. In any case, engine speed sensor 32 is operable to provide control computer 12 with an engine speed signal indicative of engine rotational speed.

System 10 further includes a vehicle speed sensor 36 electrically connected to an input IN3 of control computer 12 via signal path 38. In one preferred embodiment, sensor 36 is disposed about propeller shaft 20 adjacent to transmission 16, although the present invention contemplates locating sensor 36 anywhere along propeller shaft 20. In any case, sensor 36 is preferably a variable reluctance sensor or other known sensor configured to provide control computer with a propeller shaft speed signal from which control computer 12 can compute a corresponding vehicle speed or road speed in accordance with known techniques. Those skilled in the art will recognize that system 10 may alternatively or additionally include other known sensors for determining vehicle speed, wherein one such alternative is shown in phantom in FIG. 1 as a wheel speed sensor 50 electrically connected to an anti-lock brake system (ABS) 54 via signal path 56. Other alternatives will become apparent to those skilled in the art, and any such alternatives are intended to fall within the scope of the present invention.

Control computer 12 preferably includes an I/O port configured for data communications in accordance with a known communications protocol such as SAE J1587, SAE J1939, CAN, or the like. A communications path 48 is connected to the I/O port of control computer 12 and may include any number, M, of communication lines wherein M may be any positive integer. Communications path 48 is preferably configured for serial communications in accordance with any of the communications protocols described hereinabove, but may alternatively be configured for parallel or other communications in accordance with other known communications protocols.

Transmission 16 may, in some embodiments, include a transmission control module 44, as will be described in greater detail hereinafter. In such embodiments, transmission control module 44 includes a transmission control computer 46 operable to control operation of at least some of the functions of transmission 16, and electrically connected to communications path 48.

System 10 may further include an anti-lock braking system (ABS) 54, as briefly described hereinabove, having an auxiliary computer 52 electrically connected to communications path 48 and preferably to wheel speed sensor 50. As is known in the art, any of computers 12, 46 and 52 may electronically communicate with any other computer, controller, or data processor having a communications port connected to signal path 48. Generally, computers 12, 46 and 52 are operable to share engine and/or other vehicle operating information via communications path 48, such as by transmitting and receiving various "datalink" messages in accordance with any of a number of known communications protocols. In any case, system 10 also preferably includes a service/recalibration tool 58 of known construction and connectable to communications path 48, wherein tool 58 may be used to program, provide information to, or extract information from, any of the computers 12, 46 or 52.

Transmission 16 may take the form of any of a number of known embodiments. For example, transmission 16 may be a manual change-gear transmission having a plurality of manually selectable gear ratios. In this case, transmission 16 includes a gear shifting mechanism (not shown) that is mechanically coupled to transmission 16 and is manually actuatable for selecting desired gear ratios of transmission 16 in a manner well known in the art. Alternatively, transmission 16 may be a so-called manual/automatic or semi-automatic transmission having a number of manually selectable gear ratios and a number of automatically selectable gear ratios. In this embodiment, transmission 16 includes a manual gear shifting mechanism, as described hereinabove, for manually selecting certain gear ratios of transmission 16. The manual gear shifting mechanism in this embodiment typically includes an "automatic" position, and when the automatic position of the gear shifting mechanism is selected the control circuit 12 is typically operable to control automatic shifting between the number of automatically selectable gear ratios. Alternatively, transmission 16 may include a transmission control module 44 having a transmission control computer 46 programmed to control shifting between the automatically selectable gear ratios in a known manner. Transmission control computer 46 includes a communications port electrically connected to a communications port (I/O) of control computer 12 via signal path 48, whereby control computer 12 and transmission control computer 46 may share information according to any of a number of desired communications protocols. Signal path 48 includes a number, M, of signal lines wherein M may be any positive integer, and in one embodiment, signal path 48 represents a serial communications path configured for electronic communications between control computer 12 and transmission control computer 46 (and auxiliary control computer 52) via a known serial communications protocol. Examples of serial communications protocols suitable for use with the present invention include, but are not limited to, SAE J1587, SAE J1939, CAN and the like. Alternatively, signal path 48 may represent a parallel communications path configured for electronic communications between control computer 12 and transmission control computer 46 via a known parallel communications protocol. In any case, the automatic/manual transmission 16 of this embodiment is typically referred to as a "Top-2" transmission typically having a number of manually selectable gear ratios and two automatically selectable gear ratios.

As another example, transmission 16 may be a so-called automated manual transmission having at least one manually selectable gear ratio and a number of automatically selectable gear ratios. In this embodiment, transmission control computer 46 is typically operable to control shifting between the automatically selectable gear ratios of transmission 16, and to share appropriate information relating thereto with control computer 12 via communications path 48. Alternatively, control computer 12 may be configured in this embodiment to control shifting between the automatically selectable gear ratios of transmission 16. In either case, both control computer 12 and transmission control computer 46 are configured to broadcast and receive operational information via communications path 48, wherein such operational information may be in the form of instantaneous operational data, accumulated operational data, functional requests and/or commands, and the like.

Figures 2A, 2B:
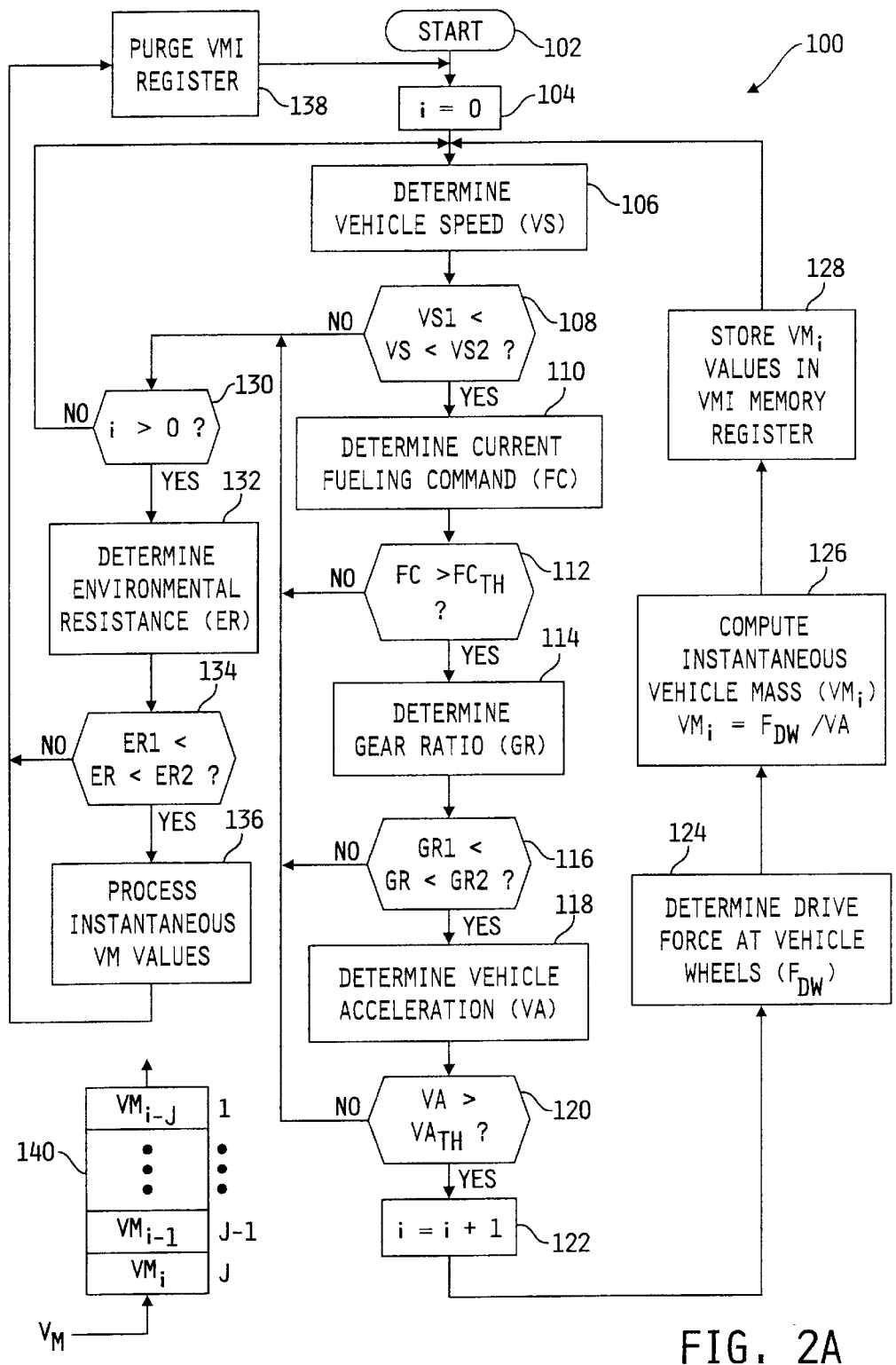
FIG. 2A is a flowchart illustrating one preferred embodiment of a software algorithm for estimating vehicle mass, in accordance with another aspect of the present invention, using the system of FIG. 1.
FIG. 2B is a diagrammatic illustration of a memory register demonstrating one preferred technique for storing instantaneous vehicle mass estimate values, in accordance with the present invention.

Referring now to FIG. 2A, a flowchart illustrating one preferred embodiment of a software algorithm 100 for estimating vehicle mass, in accordance with the present invention, is shown. The present invention contemplates that any of the control computer 12, transmission control computer 46 or auxiliary control computer 52 may be configured to execute algorithm 100, wherein the resulting vehicle mass estimate and/or function thereof may be shared with the remaining computers via communications path 48. In one preferred embodiment, algorithm 100 is stored within memory 15 and is executed by control computer 12, and will be described as such with reference to the remaining FIGS. It is to be understood, however, that algorithm 100 may alternatively be executed by either the transmission control computer 46 or the auxiliary computer 52. The following description of algorithm 100 will accordingly include descriptions of certain algorithm step modifications, where appropriate, to enable execution of algorithm 100 by either computer 46 or computer 52.

Algorithm 100 begins at step 102 and at step 104, control computer 12 is operable to set a counter value, i, equal to a predetermined counter value; e.g., zero. Thereafter at step 106, control computer 12 is operable to determine a vehicle speed value VS. In one embodiment, control computer 12 is operable to execute step 106 by reading the instantaneous value of the tailshaft rotational speed sensor 36 and converting this value to a vehicle road speed value in a known manner. Alternatively, auxiliary computer 52 or transmission control computer 46 may be configured to determine information relating to vehicle road speed and provide this information to control computer 12 via communications path 48, wherein control computer 12 is operable to convert such information to a vehicle road speed value in a known manner. For example, auxiliary computer 52 may be configured to read the instantaneous value of the wheel speed sensor 50 and provide this data to control computer 12 via communications path 48, whereby control computer 12 may convert this data to a vehicle road speed value in a known manner. Alternatively still, either auxiliary computer 52 or transmission control computer 46 may be configured to determine a vehicle road speed value and provide this information to control computer 12 via communications path 48. In embodiments wherein transmission control computer 46 or auxiliary computer 52 are configured to execute algorithm 100, any of the foregoing techniques may be employed to determine a vehicle road speed value VS, wherein appropriate information may be broadcast to the corresponding computer 46 or 52 via communications path 48.

Following step 106, algorithm execution advances to step 108 where control computer 12 is operable to compare the vehicle road speed value VS to lower and upper road speed threshold values VS1 and VS2 respectively. The present invention recognizes that there exists a range of optimal vehicle road speeds for estimating vehicle mass, m, according to the general equation m=F/A, where F is the vehicle drive force and A is the vehicle acceleration. At road speeds below this optimal vehicle road speed range, the forces required to overcome inertial forces of rotating components in the vehicle drive line have a significant effect upon vehicle drive force and vehicle acceleration, wherein such inertial forces are typically difficult to model. Likewise, at road speeds above this optimal road speed range, environmental factors such as vehicle aerodynamic drag force and the like, which are also difficult to model, tend to have a stronger impact on vehicle drive force and vehicle acceleration than at slower vehicle road speeds. Accordingly, the lower and upper road speed threshold values VS1 and VS2 are preferably established such that the such that the foregoing adverse effects on vehicle drive force and vehicle acceleration in the vehicle road speed range defined therebetween are minimized. Those skilled in the art will recognize that VS1 and VS2 are at least somewhat dependent upon the engine/driveline configuration as well as the configuration of the vehicle itself, and these factors should be considered when choosing the VS1 and VS2 values. In any case, referring back to algorithm 100, if the instantaneous vehicle road speed value VS is between VS1 and VS2, algorithm execution advances to step 110. Otherwise algorithm execution advances to step 128.

If the vehicle road speed condition of step 108 is satisfied, control computer 12 is operable at step 110 to determine a current fueling command value FC. In embodiments where algorithm 100 is executed by control computer 12, control computer 12 is operable to compute the fueling command values as described hereinabove, and therefore has ready access to such information. In alternate embodiments where algorithm 100 is executed by either the transmission control computer 46 or auxiliary computer 52, such computers may execute step 110 by monitoring the communications path 48 for fueling command information broadcast thereon by control computer 12. In any case, algorithm 100 advances thereafter to step 112 where control computer 12 is operable to compare the current fueling command value FC with a fueling command threshold $FC_{TH}$. Preferably, $FC_{TH}$ reflects a fueling command value above which the engine 14 is being worked adequately to efficiently accelerate the vehicle carrying the engine 14. In any case, if the current fueling command value FC is above $FC_{TH}$, algorithm execution advances to step 114, and otherwise advances to step 128.

At step 114, control computer 12 is operable to determine a currently engaged gear ratio, GR, of transmission 16. In embodiments wherein transmission 16 includes manually selectable gear ratios, control computer 12 is preferably operable to determine the currently engaged gear ratio as a ratio of engine speed, provided by engine speed sensor 32, and vehicle speed, provided by tailshaft speed sensor 36, as is known in the art. In embodiments wherein transmission 16 includes transmission control computer 46 operable to control selection of one or more gear ratios, the transmission control computer 46 typically broadcasts onto communications path 48 various operational conditions of transmission 16 including, for example, confirmation of gear disengagement, out-of-gear condition, confirmation of gear engagement, currently engaged gear ratio, and the like. In this embodiment, control computer 12 is operable to execute step 114 by monitoring communications path 48 for such gear ratio information. In embodiments wherein transmission control computer 46 is executing algorithm 100, computer 46 is preferably operable to execute step 114 by computing such information in a manner known in the art, or by monitoring communications path 48 for appropriate gear ratio information broadcast thereon by control computer 12. In embodiments wherein the auxiliary control computer 52 is executing algorithm 100, computer 52 is preferably operable to execute step 114 by monitoring communications path 48 for appropriate gear ratio information broadcast thereon by control computer 12 and/or by transmission control computer 46.

In any case, algorithm execution advances from step 114 to step 116 where control computer 12 is operable to compare the gear ratio value GR to lower and upper gear ratio values GR1 and GR2 respectively. The present invention recognizes that there exists a range of optimal gear ratios for estimating vehicle mass, m, according to the general equation m=F/A. At gear ratios above this optimal gear ratio range (corresponding to the numerically lower transmission gears; e.g. $1^{st}$, $2^{nd}$, etc. gears), the forces required to overcome inertial forces of rotating components in the vehicle driveline have a significant effect upon vehicle drive force and vehicle acceleration, wherein such inertial forces are typically difficult to model. Likewise, at gear ratios below this optimal gear ratio range (corresponding to the numerically higher transmission gears), environmental factors such as vehicle aerodynamic drag force, rolling resistance and the like, which are also difficult to model tend to have a stronger impact on vehicle drive force and vehicle acceleration than at higher gear ratios. Accordingly, the lower and upper gear ratio values GR1 and GR2 are preferably established such that the such that the foregoing adverse effects on vehicle drive force and vehicle acceleration in the gear ratio range defined therebetween are minimized.

It bears pointing out that steps 114 and 116 of algorithm 100 serve at least two functions. First, if a transmission gear is currently engaged, steps 114 and 116 provide information regarding the currently engaged gear ratio relative to the gear ratio range defined by GR1 and GR2 as just described. Secondly, if no transmission gear is currently engaged, the currently engaged gear ratio GR, if computed by control computer 12, will indicate an out-of-gear condition. In embodiments wherein one of the computers 12 or 52 is operable to monitor the communications path 48 for gear ratio information, transmission control computer 46 is operable in a gear disengaged condition to broadcast corresponding information onto path 48 in place of a valid gear ratio value. Thus steps 114 and 116 serve the dual purposes of determining whether a valid gear ratio is currently engaged and, if so, whether the currently engaged gear ratio is within the gear ratio range defined by GR1 and GR2. In any case, if GR is within the gear ratio range defined by GR1 and GR2, algorithm execution advances to step 118, and otherwise advances to step 128.

At step 118, control computer 12 is operable to determine an instantaneous vehicle acceleration value VA. Preferably, control computer 12 is operable to determine the instantaneous vehicle acceleration value VA as a well-known function of vehicle road speed, wherein road speed may be provided according to any of the techniques described hereinabove with respect to step 106. In embodiments wherein the transmission control computer 46 is operable to execute algorithm 100, computer 46 may determine vehicle road speed directly as a function of tailshaft speed, or by monitoring the communications path 48 for vehicle road speed information broadcast thereon by control computer 12 or auxiliary computer 52. In either case, computer 46 is preferably operable to determine an instantaneous vehicle acceleration value as a well-known function of vehicle road speed. In embodiments wherein the auxiliary control computer 52 is operable to execute algorithm 100, computer 52 may determine road speed directly as a function of wheel speed provided by wheel speed sensor 50, or by monitoring the communications path 48 for vehicle road speed information broadcast thereon by control computer 12 or transmission control computer 46. In any event, algorithm execution advances from step 118 to step 120 where control computer 12 is operable to compare the instantaneous vehicle acceleration value VA to a vehicle acceleration threshold value $VA_{TH}$. If the instantaneous vehicle acceleration value VA is greater than $VA_{TH}$, algorithm execution advances to steps 122, 124 and 126 where control computer 12 is operable to compute a vehicle mass estimate. If, on the other hand, VA is not greater than $VA_{TH}$ at step 120, algorithm execution advances to step 128.

It should now be apparent from the foregoing that steps 106–120 of algorithm 100 represent a number of preconditions that preferably must be satisfied before computing vehicle mass estimates in accordance with the present invention.

Specifically, vehicle road speed must be within a range defined by vehicle speed thresholds VS1 and VS2, the current fuel command value FC must be greater than a fueling command threshold $FC_{TH}$, the current gear ratio GR must fall within a gear ratio range defined by gear ratio threshold values GR1 and GR2, and the instantaneous vehicle acceleration value VA must be greater than a vehicle acceleration threshold value $VA_{TH}$. However, it is to be understood that the present invention contemplates alternate embodiments of algorithm 100 that include either more or less of the preconditions represented by steps 106–120. For example, one alternate embodiment of algorithm 100 may omit steps 110–112 and modify steps 114–116 to ensure only that a valid gear ratio is engaged. As another example, system 10 illustrated in FIG. 1 may include an inclinometer, and algorithm 100 may be modified to include another precondition requiring the road grade to be less than a road grade limit before computing vehicle mass estimates. Those skilled in the art will recognize further precondition steps and/or other subcombinations of the precondition steps to be added to, or omitted from, algorithm 100, and such additions or omissions are intended to fall within the scope of the present invention.

Figure 3:
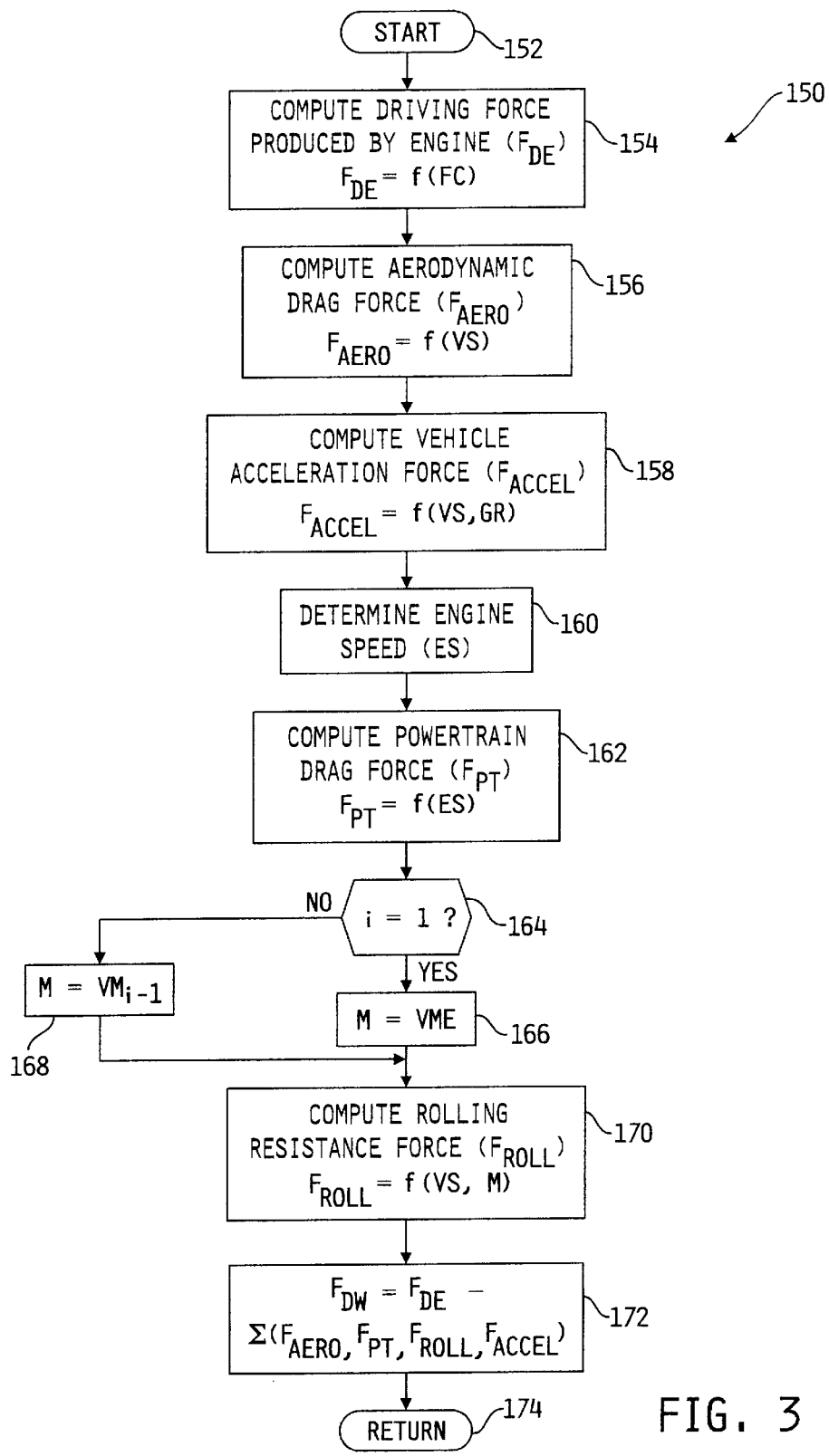
FIG. 3 is a flowchart illustrating one preferred embodiment of a software algorithm for determining a net driving force at the wheels of the vehicle for use by the algorithm of FIG. 2.

If, at step 120, control computer 12 determines that VA is greater than $VA_{TH}$, algorithm execution advances to step 122 where the counter value i is incremented by one. Thereafter at step 124, control computer 12 is operable to determine an instantaneous drive force $F_{DW}$ at the vehicle wheels. Referring now to FIG. 3, one preferred embodiment of a software routine 150 for carrying out step 124 of algorithm 100, in accordance with the present invention, is shown. Routine 150 begins at step 152 and at step 154, control computer 12 is operable to compute a driving force $F_{DE}$ produced by the engine 14. Preferably, control computer 12 is operable to determine $F_{DE}$ as a function of the current fueling command value FC, in accordance with well-known equations, although the present invention contemplates determining $F_{DE}$ according to any of a number of known alternate techniques. For example, the output drive shaft (not shown) of engine 14 may be fitted with a strain gauge sensor of known construction, wherein such torque signals produced by such a sensor may be processed in a known manner to determine engine drive force $F_{DE}$. Those skilled in the art will recognize other known techniques for determining $F_{DE}$, wherein such other known techniques are intended to fall within the scope of the present invention. In embodiments wherein routine 150 is executed by either transmission control computer or auxiliary computer 52, control computer 12 is generally operable to broadcast current engine fueling or engine output torque information onto communications path 48, and step 154 may thus be executed in these embodiments by monitoring the communications path 48 for current fueling or torque information and converting such information into engine driving force $F_{DE}$ according to well-known equations.

Following step 154, routine 150 advances to step 156 where control computer 12 is operable to compute an aerodynamic drag force $F_{AERO}$, preferably as a function of vehicle speed VS. In one embodiment, $F_{AERO}$ is computed by control computer 12 at step 156 according to the equation $F_{AERO}=0.5*p*A_F*K_{AERO}*VS^2$, wherein "p" is the density of ambient air, "$A_F$" is the frontal area of the vehicle and $K_{AERO}$ is an aerodynamic drag coefficient. Preferably, "p", "$A_F$" and "$K_{AERO}$" are stored as constants in memory 15 of control computer 12 (or in a suitable memory unit of transmission control computer 46 or auxiliary computer 52 when routine 150 is executed thereby), wherein any one or more of these values may be adjusted via service/recalibration tool 58, and wherein example values for these constants are p=1.202 kg/m$^3$, $A_F$=10.968 m$^2$ and $K_{AERO}$=0.646. It is to be understood, however, that the aerodynamic drag force $F_{AERO}$ may alternatively be computed at step 156 according to one or more other known equations therefore, and that any such alternative computational strategies are intended to fall within the scope of the present invention.

Thereafter at step 158, control computer 12 is operable to compute a vehicle resistance to acceleration force $F_{ACCEL}$, preferably as a function of vehicle speed VS and gear ratio GR. In general, vehicle resistance to acceleration force may be defined by the equation $F_{ACCEL}=M_i*VS$, wherein $M_i$ is the mass due to inertia of the rotating components of the vehicle powertrain, and wherein $M_i=(Ie*GR^2*RAR^2)/R^2$. In this equation, "Ie" is engine inertia, "GR" transmission gear ratio, "RAR" is the rear axle ratio and "R" is the radius of the tires. Preferably "R", "RAR" and "Ie" are stored as constants in memory 15, wherein any one or more of these values may be adjusted via service/recalibration tool 58, and wherein example values for these constants are R=0.496 at 514 revs/mile, RAR=1.2, and Ie=2.85 kg*m$^2$. It is to be understood, however, that the vehicle resistance to acceleration force $F_{ACCEL}$ may alternatively be computed at step 158 according to one or more other known equations therefore, and that any such alternative computational strategies are intended to fall within the scope of the present invention.

Thereafter at step 160, control computer 12 is operable to determine a current engine rotational speed ES, preferably by monitoring the signal produced by engine speed sensor 32. In embodiments wherein transmission control computer 46 or auxiliary computer 52 are executing routine 150, control computer 12 is operable to broadcast a current engine speed value ES onto the communications path 48, and step 160 may thus be executed by computer 46 or 52 by monitoring the communications path 48. In any case, the execution of routine 150 advances from step 160 to step 162 where control computer 12 is operable to compute a powertrain drag force $F_{PT}$, preferably as a function of engine speed ES. In one embodiment, control computer 12 is operable at step 162 to compute the powertrain drag force by taking into account resistive forces due to engine accessory use as well as powertrain mechanical efficiencies including friction (i.e., bearing, seal face, etc.), gear mesh, spin, churning and windage. Those skilled in the art will recognize that the powertrain drag force term $F_{PT}$ may be calculated according to a number of known techniques and may include any number of desired terms corresponding to any number of engine accessory and/or powertrain mechanical components. For example, the engine alternator (not shown) is known to require constant power independent of engine speed, whereas engine cooling fan loss is proportional to $ES^3$, air conditioning loss, if an air conditioning unit (not shown) is activated, is proportional to $ES^2$, power steering loss is proportional to $ES^2$, and so forth. Preferably, equations and/or constants relating to such components of $F_{PT}$ are stored within memory 15, and one or more terms making up $F_{PT}$ are computed by computer 12 as a known function of engine speed. Alternatively, an estimate of $F_{PT}$ may be stored within memory 15 as a constant, and recalled by computer 12 when executing step 162. It is to be understood, however, that the powertrain drag force term $F_{PT}$ may be computed at step 162 according to one or more known equations therefore, and that any such computational strategies are intended to fall within the scope of the present invention.

From step 162, routine 150 advances to step 164 where control computer 12 tests the counter i to determine whether the vehicle drive force sample currently being determined is a first sample in a set of samples. If so, i=1 and routine 150 advances to step 166 where a vehicle mass value VM is set to the current vehicle estimate value VME (i.e., the current vehicle mass estimate resulting from one or more traversals of algorithm 100). If the vehicle drive force sample currently being determined is an intermediate sample in a set of samples, i is greater than 1 and routine 150 therefore advances to step 168 where the vehicle mass value VM is set to the previously determined vehicle mass value $VM_{i-1}$(i.e., the vehicle mass value computed in the previous iteration of algorithm 100). From either of steps 166 or 168, routine 150 advances to step 170 where control computer 12 is operable to compute a rolling resistance force $F_{ROLL}$, preferably as a function of vehicle speed VS and the vehicle mass value VM resulting from either of steps 166 or 168. In one embodiment, the rolling resistance force is computed by control computer 12 at step 170 according to the equation $F_{ROLL}=(K_{STATIC}+K_{DYNAMIC}*VS)*VM$, wherein "$K_{STATIC}$" is a static rolling resistance coefficient and "$K_{DYNAMIC}$" is a dynamic rolling resistance coefficient. Preferably, "$K_{STATIC}$" and "$K_{DYNAMIC}$" are stored as constants in memory 15, wherein either of these values may be adjusted via service/recalibration tool 58, and wherein example values for these constants are $K_{STATIC}$=0.042 N/Kg and $K_{DYNAMIC}$=0.000899 (N*sec)/(meter*Kg). When i=1, this indicates that all of the preconditions of steps 106–120 have just been met and the first vehicle drive force value $F_{DW_1}$ is therefore the first vehicle drive force value being computed for the current acceleration event. As such, there is no previous vehicle mass estimate value for the current acceleration event (i.e., no $VM_0$ value) and in this case the vehicle mass value VM in the foregoing equation is preferably set equal to the current vehicle mass estimate value VME resulting from algorithm 100. Alternatively, VM in the foregoing equation may be set to a desired vehicle mass value stored in memory 15 when i=1. On the other hand, when i>1, there exists a previously computed vehicle mass estimate $VM_{i-1}$, for the current acceleration event, and in this case the vehicle mass value VM in the foregoing equation is preferably set equal to the previously computed vehicle mass estimate value $VM_{i-1}$. In any case, it is to be understood that the rolling resistance force $F_{ROLL}$ may alternatively be computed at step 170 according to one or more other known equations therefore, and that any such alternative computational strategies are intended to fall within the scope of the present invention.

Following step 170, routine 150 advances to step 172 where control computer 12 is operable to compute a vehicle drive force $F_{DW}$ preferably as a difference between $F_{DE}$ (computed at step 154) and the sum of $F_{AERO}$, $F_{ACCEL}$, $F_{PT}$ and $F_{ROLL}$ (computed at steps 156, 158, 162 and 170 respectively). Thereafter at step 174, routine 150 returns to its calling routine (i.e., step 124 of algorithm 100).

The present invention contemplates that any one or more of the resistance forces $F_{AERO}$, $F_{ACCEL}$, $F_{PT}$ and $F_{ROLL}$ computed in routine 150 may alternatively be stored in memory as a constant. Corresponding steps of routine 150 may accordingly be modified such that the resistance force (s) are recalled from memory 15 rather than computed as illustrated in FIG. 3. For example, in one alternative embodiment, each of the resistance forces $F_{AERO}$, $F_{ACCEL}$, $F_{PT}$ and $F_{ROLL}$ are represented as a single constant and stored in memory as a corresponding resistance force constant. In this embodiment, steps 156–170 are replaced with the single step of recalling the resistance force constant from memory. Step 174 is then modified to compute $F_{DW}$ as a difference between $F_{DE}$ and the resistance force constant. Those skilled in the art will recognize other ones or combinations of $F_{AERO}$, $F_{ACCEL}$, $F_{PT}$ and $F_{ROLL}$ that may be alternatively be represented as constants and stored as such in memory 15, and any such alternate resistance force computational strategy is intended to fall within the scope of the present invention.

Referring again to FIG. 2A, algorithm 100 advances from step 124 to step 126 where control computer 12 is operable to compute an instantaneous vehicle mass estimate $VM_i$ as a ratio of the vehicle drive force value $F_{DW}$ computed at step 14 and the vehicle acceleration value VA determined at step 118. Thereafter at step 128, control computer 12 is operable to store the $VM_i$ value computed at step 126 into an instantaneous vehicle mass (VMI) register within memory 15. Thereafter, algorithm 100 loops back to step 106 to ensure that all of the preconditions of steps 106–120 are still satisfied for the current acceleration event before computing another vehicle mass estimate $VM_i$.

Figure 4:
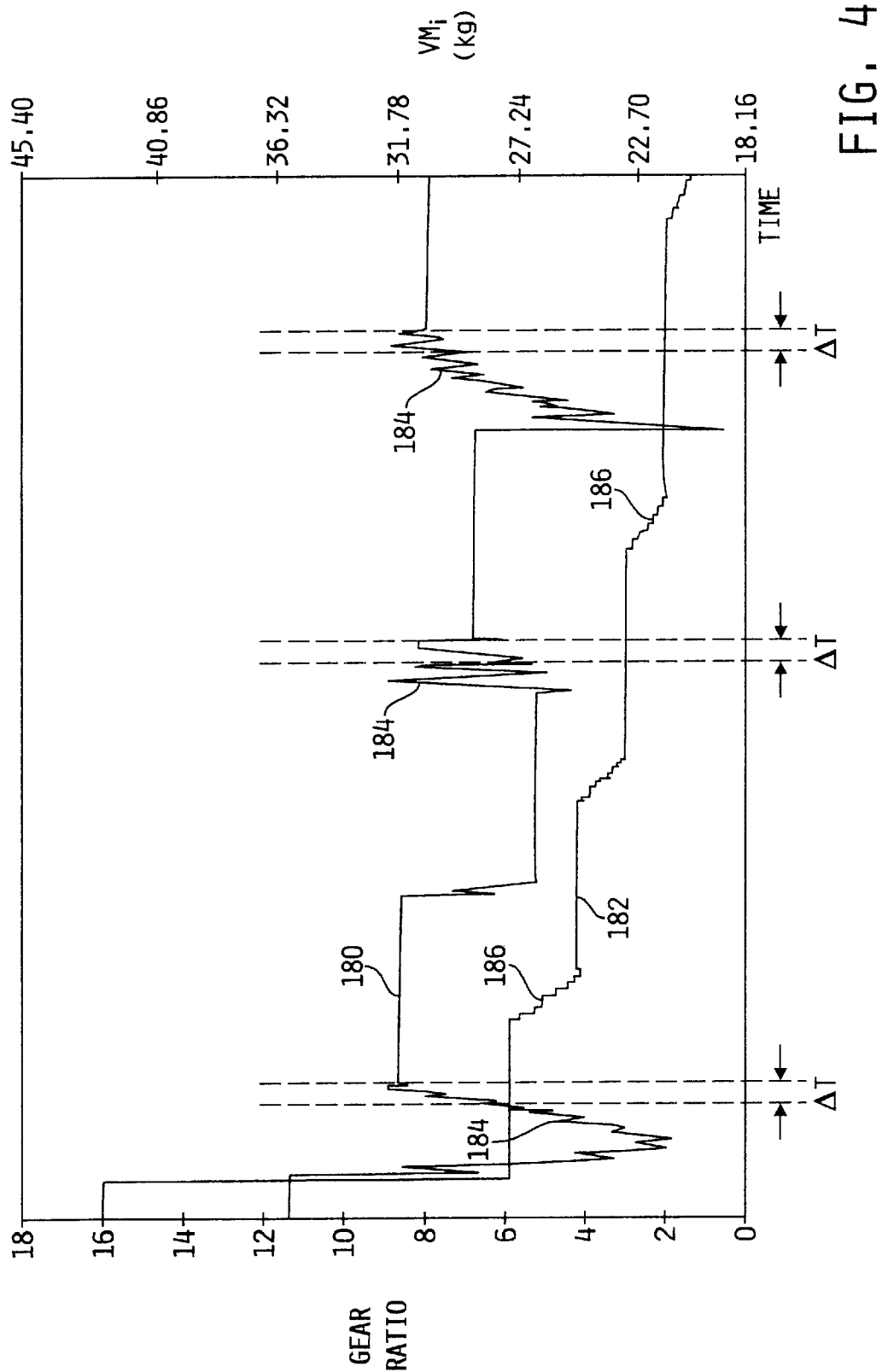
FIG. 4 is a plot of estimated vehicle mass and gear ratio over time illustrating one preferred technique for collecting net driving force and vehicle acceleration data for use by the algorithm of FIG. 2 in estimating vehicle mass.

Referring now to FIG. 2B, one preferred embodiment of a VMI register 140 within memory 15, for use with step 128 of algorithm 100, is shown. Preferably, register 140 is configured to maintain only up to a predefined number of VM samples computed near the end of an acceleration sequence defined by any of the preconditions of steps 106–120 to thereby avoid subsequent inaccurate vehicle mass estimates due to elastic driveline effects such as the spring rate of driveline components, and other effects such as backlash of the powertrain system, and the like. In one embodiment, for example, register 140 is preferably configured to hold "J" samples, wherein J may be any positive integer (e.g., 50). VMI register 140 is preferably configured in this embodiment as a queue storing each newly computed vehicle mass value in the Jth position, and shifting all previously stored mass values one position toward the J=1 position. In this manner, register 140 is thus configured to maintain only the J most recent VM samples $VM_i$–$VM_{i-j}$. Referring to FIG. 4, the operation of this embodiment of register 140 is illustrated with a plot of instantaneous vehicle mass samples $VM_i$ 180 and gear ratio 182 vs. time. Regions 184 of $VM_i$ represent acceleration events following a shift 186 to a next transmission gear. In accordance with the present embodiment of step 128, only the last J samples prior to the end of an acceleration event 184, or alternatively only the J samples taken during the time window ΔT that terminates at the end of an acceleration event, are stored in register 140. In accordance with one aspect of the present invention, either of the foregoing techniques are preferably used to collect instantaneous vehicle mass samples to avoid inaccurate vehicle mass estimates due to driveline windup effects and the like.

Referring again to FIG. 2A, if the tested conditions at any of steps 108, 112, 116 are not met, algorithm 100 advances therefrom to step 130 where control computer 12 tests the count value i. If i is not greater than zero, this indicates that at least one of the preconditions of steps 106–120 has not yet been met, and therefore that no instantaneous vehicle mass samples $VM_i$ are currently available. This will be true when the vehicle is currently not undergoing an acceleration event or if any one of the preconditions of steps 106–120 has not yet been met for the current acceleration event. In either case, algorithm 100 loops back to step 106. If, however, i is greater than zero at step 130, this indicates that at least one of the preconditions of steps 106–120 is no longer met, and that the current vehicle acceleration event has terminated. In this case, algorithm execution advances to step 132 where control computer 12 is operable to determine an environmental resistance factor ER. In accordance with the present invention, ER preferably represents an accumulative effect of one or more environmental forces/conditions acting upon the vehicle carrying engine 14 that may corrupt or otherwise cause the various instantaneous vehicle mass estimates $VM_i$ to be inaccurate. Examples of such environmental forces/conditions include, but are not limited to, road grade variations (e.g., positive and/or negative road grades), road conditions (e.g., road composition, weather conditions, etc.), wind force (from any direction), and the like.

Figure 5:
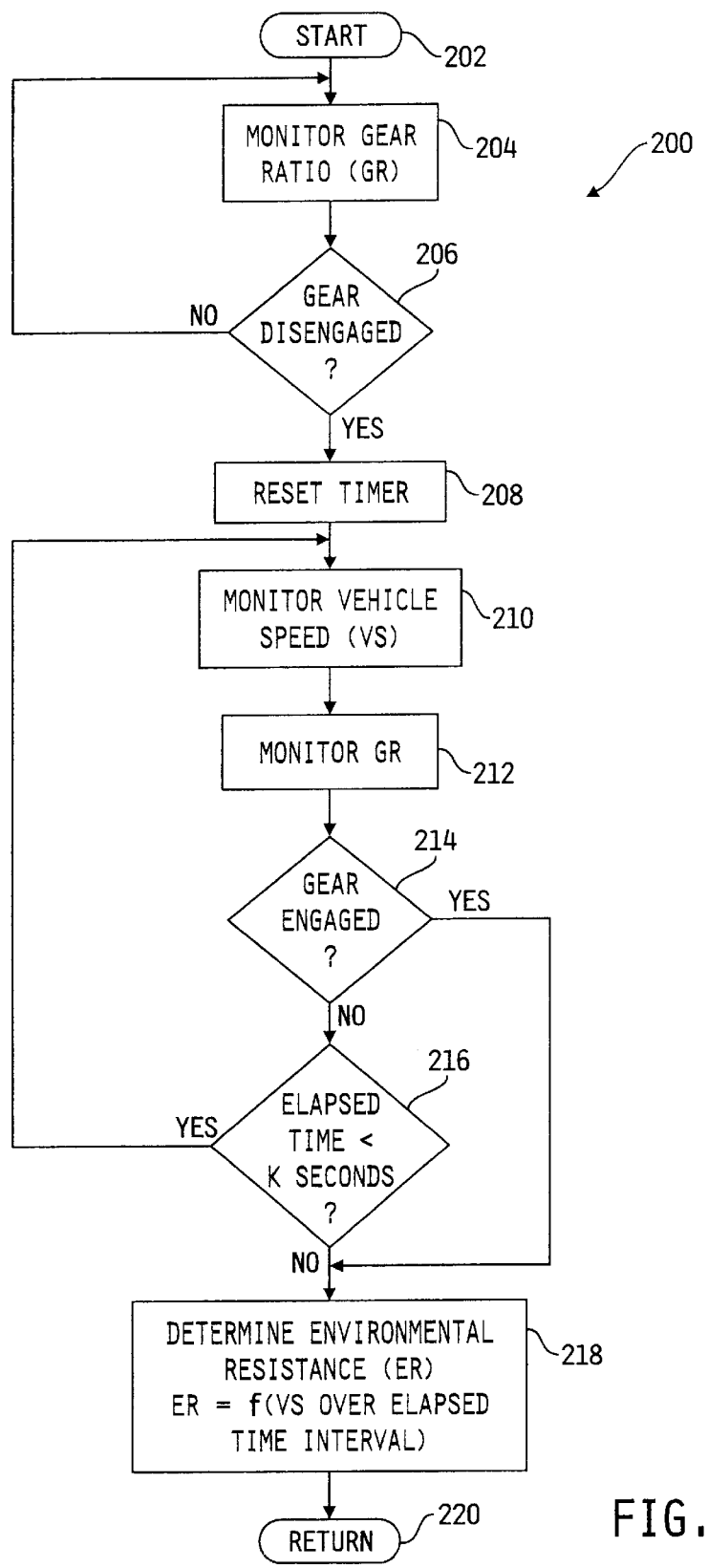
FIG. 5 is a flowchart illustrating one preferred embodiment of a software algorithm for determining an environmental resistance parameter, indicative of environmental resistance forces acting on the vehicle, for use by the algorithm of FIG. 2.

In one embodiment of the present invention, control computer 12 is preferably operable at step 132 to determine the environmental resistance factor ER as a function of a change in vehicle speed during a shift to a next transmission gear. Referring to FIG. 5, one preferred embodiment of a software routine 200 for executing step 132 of algorithm 100 in such a manner, in accordance with the present invention, is shown. Routine 200 begins at step 202, and at step 204, control computer 12 is operable to monitor gear ratio (GR) using any of the techniques described hereinabove with respect to step 114 of algorithm 100. In embodiments wherein transmission control computer 46 or auxiliary computer 52 is operable to execute routine 200, any such computer is likewise operable to execute step 202 by monitoring gear ratio (GR) using any of the techniques described hereinabove. Thereafter at step 206, control computer 12 is operable to determine whether disengagement of the currently engaged gear has occurred pursuant to an shift to a next transmission gear. In one embodiment, control computer 12 is operable to determine whether gear disengagement has occurred pursuant to a shift by monitoring engine speed and tailshaft speed as described hereinabove. Alternatively, if transmission 16 includes a transmission control module 44, transmission control computer 46 is typically operable to broadcast onto communications path 48 the status of the transmission including gear engagement/disengagement conditions. Control computer 12 may alternatively be operable in such embodiments to execute step 206 by monitoring communications path 48 for appropriate messages broadcast by transmission control computer 46. In embodiments wherein either transmission control computer 46 or auxiliary computer 52 are configured to execute routine 200, such computers are preferably operable to execute step 206 in a known manner such as described hereinabove with respect to steps 114 and 116 of FIG. 2. In any case, if gear disengagement pursuant to a shift to a next transmission gear is not detected at step 206, routine 200 loops back to step 204 to monitor gear ratio GR. If such gear disengagement is detected at step 206, execution of routine 200 advances to step 208 where control computer 12 is operable to reset a timer internal thereto to a default value (e.g., zero).

Following step 208, control computer 12 is operable at step 210 to monitor vehicle speed VS and thereafter at step 212 to monitor gear ratio, wherein each of steps 210 and 212 are executed according to any of the techniques described hereinabove. Thereafter at step 214, control computer 12 is operable to determine whether the shift is complete preferably by determining whether engagement of the next transmission gear has occurred. In one embodiment, control computer 12 is operable to execute step 214 by monitoring engine speed ES and vehicle speed VS, and determining that gear engagement has occurred when a ratio thereof is within predefined gear ratio limits. In embodiments where transmission 16 includes a transmission control module 44, transmission control computer 46 is typically operable to broadcast onto communications path 48 a gear engagement message indicating that engagement of the next transmission gear has occurred. In such embodiments, control computer 12 may alternatively be operable to execute step 214 by monitoring communications path 48 for a gear engagement message broadcast by, for example, transmission control computer 46. In cases where either transmission control computer 46 or auxiliary computer 52 is operable to execute routine 200, either such computer is preferably operable to execute step 214 by processing information internal thereto and/or monitoring the communication path 48 for appropriate information as described hereinabove. In any case, if gear engagement is not detected at step 214, control computer 12 is operable at step 216 to determine whether the elapsed time of the timer that was reset at step 208 is less than K seconds. In one preferred embodiment, K=1 second, although the present invention contemplates that K may take on any positive value. If the elapsed time is less than K seconds, routine 200 loops back to step 210.

Figure 6:
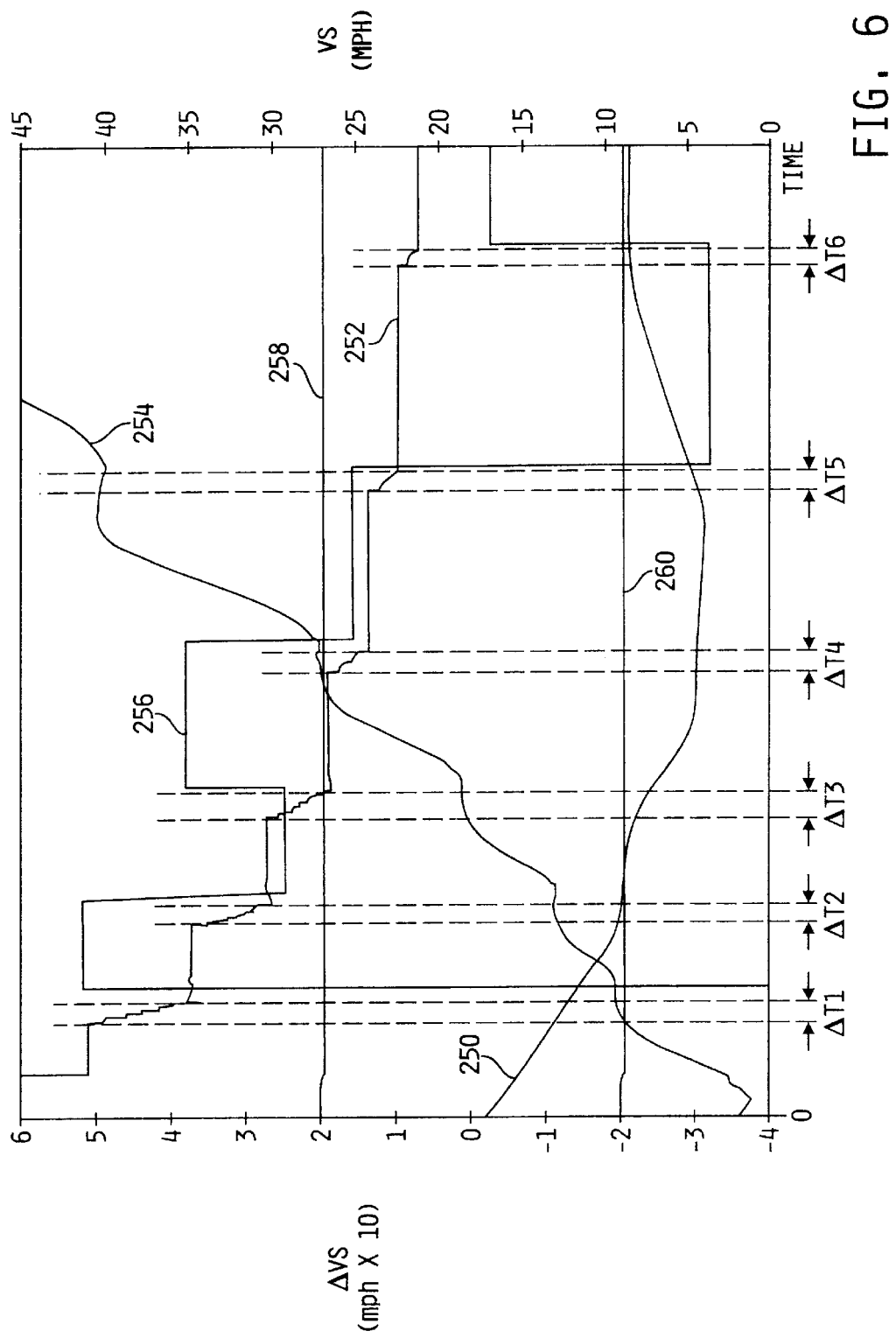
FIG. 6 is a plot of vehicle speed, gear ratio and environmental resistance illustrating operation of the algorithm of FIG. 5.

If gear engagement is detected at step 214, or if the elapsed time of the timer within control computer 12 is detected as reaching K seconds at step 216, routine 200 advances to step 218 where control computer 12 is operable to determine an environmental resistance factor ER preferably as a function of vehicle speed VS over the elapsed time interval defined by either of steps 214 or 216. Referring to FIG. 6, one preferred embodiment of step 218 is illustrated as a plot of gear ratio GR 252, vehicle speed VS 254 and a change in vehicle speed ΔVS 256, all vs. time. A road profile 250 is superimposed over the plot of FIG. 6 to illustrate the behavior of ΔVS under various road grade conditions. It is to be understood, however, that road profile 250 is not necessarily drawn to scale and is included only for illustrative purposes.

In any case, the interval ΔT1 corresponds to either the first K seconds of an upshift or the duration of the upshift (see gear ratio curve 252), whichever is shorter, and the road profile 250 in this interval indicates a somewhat strong negative grade. As a result of the negative grade in road profile 250, the vehicle speed signal VS during this interval is increasing (see curve 254), and the resulting change in vehicle speed ΔVS computed by control computer 12 therefore has a positive value (>0.5 mph), indicating that the vehicle gained road speed during the upshift on the negative grade. During the next upshift indicated by interval ΔT2, the road profile 250, while still indicating a negative grade, has flattened out somewhat from that of interval ΔT1. The resulting change in vehicle speed ΔVS computed by control computer 12 therefore still has a positive value (0.2<ΔVS<0.3 mph), although it is less than that during interval ΔT1.

During the next upshift indicated by interval ΔT3, the road profile 250 exhibits a steeper negative grade than that of interval ΔT2 but less than that of interval ΔT1. The resulting change in vehicle speed ΔVS computed by control computer 12 therefore has a positive value (approximately 0.4 mph), which is between that computed for intervals ΔT1 and ΔT2 as expected. During the next upshift indicated by interval ΔT4, the road profile 250 has flattened out to only a slight negative grade. The resulting change in vehicle speed ΔVS computed by control computer 12 therefore has a slight positive value (0.1<ΔVS<0.2 mph).

During the next upshift indicated by interval ΔT5 the road profile 250 exhibits a positive grade. The resulting change in vehicle speed ΔVS computed by control computer 12 therefore has a negative value (approximately −0.3 mph), indicating that the vehicle lost road speed on the positive grade during the upshift. During the next upshift indicated by interval ΔT6, the road profile 250 flattens out to approximately zero grade. The resulting change in vehicle speed ΔVS computed by control computer 12 therefore is therefore near zero, indicating that the vehicle maintained substantially constant road speed on the flat grade during the upshift.

In one preferred embodiment of the present invention, the change in vehicle speed ΔVS is preferably determined as a vehicle speed difference by subtracting the vehicle speed signal value VS measured just prior to confirmation of gear engagement at step 214 or detection that the elapsed time has reached K seconds at step 216 from the vehicle speed signal value VS measured just after resetting the timer at step 208. Alternatively, the change in vehicle speed ΔVS during this interval may be computed in accordance with other known signal change detection techniques, and those skilled in the art will recognize that any other such alternate signal change detection techniques are intended to fall within the scope of the present invention.

The present invention recognizes that the time to complete shifts to next transmission gears may vary widely as a result of many factors. For example, in the case of manually selectable gear ratios the operator may prefer to shift "slowly" and therefore maintain the clutch pedal depressed for up to several seconds. As another example, the operator may "miss" a shift and therefore fail to engage the next transmission gear in a timely fashion. In the case of automated manual transmissions, varying engine load, engine speed and vehicle speed factors may also cause shift times to vary significantly. In many of these cases, changes in vehicle speed that can occur over such long shift intervals may be misleading as to their cause. For example, if routine 200 allowed the change in vehicle speed to be computed over the entire shift interval (i.e., from gear disengagement to subsequent gear engagement) regardless of the elapsed time of the shift interval, and the computed change in vehicle speed ΔVS produced a large negative number, it could not be discerned from this data alone whether the vehicle was traversing a large positive grade or whether the vehicle was traversing a flat grade wherein the operator shifted slowly or missed the shift altogether. One important feature of routine 200 therefore lies in the inclusion of steps 208 and 216 that ensure that change in vehicle speed information is determined only during the shorter of the time it takes to engage the next transmission gear and the time it takes for K seconds to elapse.

It has been determined through experimentation that sufficient vehicle speed information is available for computing accurate vehicle speed change data, in one embodiment, within one second of gear disengagement, and K is accordingly set in this embodiment to 1.0 second. Those skilled in the art will recognize that other values of K may be used, and that an appropriate value for K will typically be dictated by the application of the present invention. In any case, by ensuring that the change in vehicle speed information is determined only during the shorter of the time it takes to engage the next transmission gear and the time it takes for K seconds to elapse, any effects of missed shifts and/or long shifting times on subsequent vehicle speed data are thereby avoided.

In one embodiment of the present invention, control computer 12 is operable at step 218 of routine 200 to set the environmental resistance factor ER to the vehicle speed change parameter ΔVS. Routine 200 advances from step 218 to step 220 where execution is returned to step 132 of algorithm 100 (FIG. 2A).

Referring back to FIG. 2A, algorithm 100 advances to step 134 from step 132 where control computer 12 is operable to test the environmental resistance factor ER against at least one threshold therefore. In the embodiment of step 218 of routine 200 just described, ER is set equal to ΔVS, and in this case step 134 of algorithm 100 preferably requires control computer 12 to compare ER to a lower ER threshold value ER1 and an upper threshold value ER2. Referring again to FIG. 6, an example value of ER1 is illustrated by mph threshold 260 as a constant value of −0.2 mph and an example value of ER2 is illustrated by mph threshold 258 as a constant value of 0.2 mph. Alternatively, routine 200 of FIG. 5 may be modified to include a step just before or just after step 204 requiring computer 12 to monitor vehicle acceleration. In this embodiment, algorithm 100 may also be modified to include a step prior to step 134 requiring computer 12 to compute ER1 and ER2 each as functions of the vehicle acceleration value just prior to gear disengagement. The ΔVS window defined by ER1 and ER2 may thus be expanded or contracted depending upon the vehicle acceleration value detected just prior to detection of gear disengagement at step 206 of routine 200. In one embodiment, for example, the values of ER1 and ER2 are preferably proportional to the vehicle acceleration value just prior to detection of gear disengagement at step 206 of routine 200 so that the size of the ΔVS window expands as vehicle acceleration increases.

In any case, if ER is within the boundaries defined by ER1 and ER2, this indicates that environmental resistance forces acting upon the vehicle are within acceptable limits and algorithm 100 advances to step 136 to process the instantaneous vehicle mass estimates $VM_i$ stored within VMI register 140. If, on the other hand, ER falls outside the boundaries defined by ER1 and ER2, this indicates that environmental resistance forces acting upon the vehicle are outside of acceptable limits. In this case, algorithm 100 advances to step 138 where control computer 12 purges or erases the contents of the VMI register 140. From step 138, algorithm 100 loops back to step 104.

It bears pointing out again that the environmental resistance factor just described represents a combination of any of a number of environmental resistance forces acting upon the vehicle. With reference to FIG. 6, the primary environmental resistance forces acting upon the vehicle were illustrated and described as resulting from changes in road grade. As a practical matter, other environmental resistance and/or additive forces act upon the vehicle carrying engine 14, and it is the intention of the present invention to capture the vehicle's reaction to a combination of such forces via determination of ER. Thus, for example, while in the presence of no detectable wind a downhill grade of 3% may cause ER to fall outside of the acceptable ER range defined by ER1 and ER2, the same grade with a suitable headwind acting upon the vehicle may result in an environmental resistance value ER that falls within the acceptable ER range. Those skilled in the art will recognize other environmental resistive/additive forces that may act upon the vehicle, and that control computer 12 is preferably operable at step 132 of algorithm 100 to define ER as composite or combination of any such forces. In cases where ER is indicative of environmental forces acting upon the vehicle that are sufficiently large in combination to corrupt the vehicle mass estimation data just taken, such data is rejected or otherwise disregarded by control computer 12. Conversely, when ER is indicative of environmental forces acting upon the vehicle that are sufficiently small in combination so as not to corrupt the vehicle mass estimation data just taken, such data is processed by control computer 12 in determining a final vehicle mass estimate.

It should be understood that the illustrated embodiments of steps 132 and 134 are provided only by way of example, and the present invention contemplates defining ER as other functions of the change in vehicle speed during transmission shifts, as well as testing such ER functions against one or more threshold values to determine whether to process or reject the instantaneous vehicle mass estimate values $VM_i$ stored in VMI register 140. For example, routine 200 could easily be modified to set ER to a first value if the change in vehicle speed during upshifts is within the window defined by ER1 and ER2, and to otherwise set ER to a second value. Step 134 could then be modified to determine whether ER is equal to the first ER value ER1 or the second ER value ER2. Moreover, the threshold lines 258 and 260 need not be constant-valued and may themselves define any desired functions. Furthermore, the change in vehicle speed during the upshifts could be converted to an absolute value so that the resulting absolute-valued change in vehicle speed need only be compared to a single threshold. Modifications to routine 200 and/or algorithm 100 to effectuate any such changes would be well within the knowledge and ability of a skilled artisan.

In any case, if the combination of environmental forces acting upon the vehicle are found at step 134 to be within acceptable limits, algorithm execution advances to step 136 where control computer 12 is operable to process the instantaneous vehicle mass values $VM_i$ stored within register 140. Thereafter, algorithm 100 loops back to step 104. It should be understood that although algorithm 100 has been illustrated and described as computing and processing ER after a vehicle acceleration event but before processing the instantaneous vehicle mass values $VM_i$ resulting therefrom, algorithm 100 may alternatively be configured to include steps 132 and 134 as another precondition (i.e., along with steps 106–120) to the execution of steps 124–128. Modifications to algorithm 100 for effectuating such an alternative embodiment would be well within the knowledge of a skilled programmer.

Figure 7A:
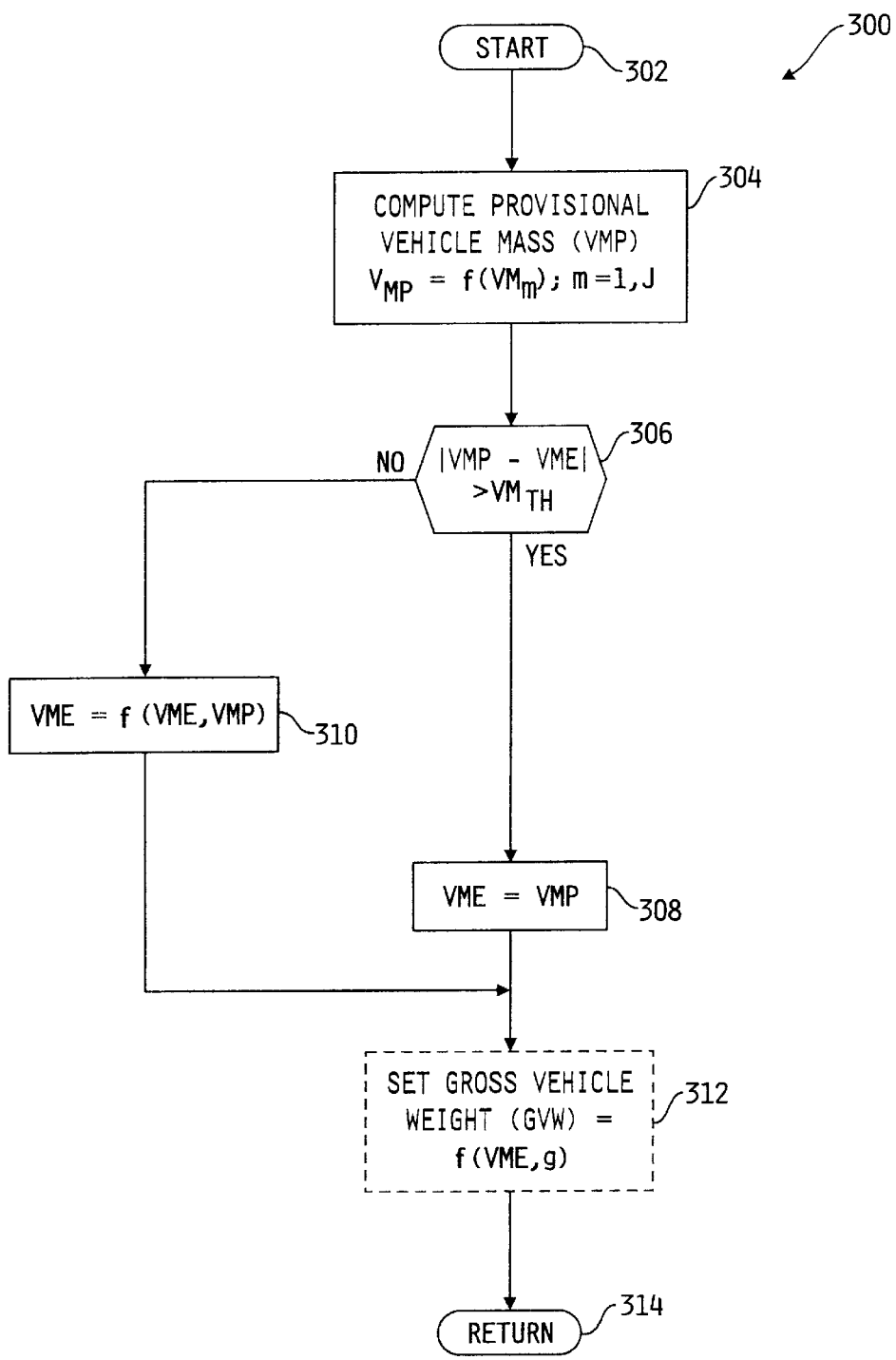
FIG. 7A is a flowchart illustrating one preferred embodiment of a software algorithm for determining a final vehicle mass estimate based on information generated by the algorithm of FIG. 2.

Referring now to FIG. 7A, a flowchart illustrating one preferred embodiment of a software routine 300 for executing step 136 of algorithm 100, in accordance with the present invention, is shown. Routine 300 begins at step 302 and at step 304, control computer 12 is operable to compute a provisional vehicle mass estimate VMP as a function of the instantaneous vehicle mass samples $VM_i$ stored in VMI register 140. In one preferred embodiment, control computer 12 is configured to execute step 304 by computing VMP as an algebraic average of the $VM_i$ samples stored within register 140, although the present invention contemplates computing VMP as other functions of the $VM_i$ samples including, but not limited to, other known sample averaging strategies. Thereafter at step 306, control computer 12 is operable to compare the absolute value of a difference between the provisional vehicle mass estimate VMP and a current vehicle mass estimate value VME (i.e., a current vehicle mass estimate value produced by algorithm 100) with a vehicle mass threshold $VM_{TH}$. If the absolute value of the difference is greater than $VM_{TH}$ at step 306, algorithm execution advances to step 308 where control computer 12 is operable to set the current vehicle mass estimate value VME to the provisional vehicle mass value VMP. Otherwise, algorithm execution advances from step 306 to step 310 where control computer 12 is operable to compute an updated VME value as a function of the current VME value and the provisional vehicle mass value VMP.

In the embodiment of routine 300 illustrated in FIG. 7, control computer 12 is preferably operable to determine whether the provisional (most recently computed) vehicle mass value VMP has deviated from the current (running) vehicle mass estimate VME by more than a threshold amount $VM_{TH}$. In one embodiment, $VM_{TH}$ is preferably a calibratable mass value (or weight value) stored in memory 15 that may or may not be modifiable via service/recalibration tool 58. Preferably, $VM_{TH}$ is chosen in this embodiment to distinguish between significant changes in vehicle mass (or weight) due to actual mass changing events such as connecting to or disconnecting from a trailer, and lesser changes in vehicle mass (or weight) due to vehicle mass computational inaccuracies. Alternatively, $VM_{TH}$ may be a dynamic threshold value computed at step 306 as a percentage of the current vehicle mass estimate value; i.e., %VME. In this embodiment, the percentage value (%) is likewise preferably chosen to distinguish between significant and lesser changes in vehicle mass (or weight) as just described. Those skilled in the art will recognize alternative strategies for determining $VM_{TH}$, and any such strategies are intended to fall within the scope of the present invention.

In cases where control computer 12 determines that VMP has not deviated sufficiently from VME so that the absolute value of the difference between VMP and VME is not greater than $VM_{TH}$ at step 306, control computer 12 is preferably operable to compute an updated VME value as a running average of the current VME value and the VMP value. In one specific embodiment, for example, control computer 12 is configured to maintain a first number of VMP samples in memory 15 (e.g., 1000), wherein each VMP sample is made up of a second number of instantaneous $VM_i$ o samples (e.g., 50) resulting from successive iterations of step 126 of algorithm 100. In this embodiment, if the difference is determined to be greater than or equal to $VM_{TH}$ at step 306, control computer 12 is preferably operable at step 310 to erase or delete the oldest VMP sample (comprising the oldest 50 $VM_i$ samples) from memory 15 if memory contains 1000 samples, and store the new VMP sample in memory 15 to thereby maintain 1000 VMP samples. If less than 1000 VMP samples are contained in memory 15, control computer 12 is preferably operable at step 310 to store the new VMP sample in memory 15 without deleting any previous VMP samples therefrom. In either case, control computer 12 is further operable in this embodiment to compute an updated vehicle mass estimate value VME as an average of the various VMP values now stored in memory 15. It is to be understood that the present invention contemplates other known strategies for computing VME as a function of one or more VMP or $VM_i$ values at step 306, and any such alternate computational strategies are intended to fall within the scope of the present invention.

In cases where control computer 12 determines that VMP has deviated sufficiently from VME such that absolute difference value is greater than $VM_{TH}$ at step 306, control computer 12 is preferably operable to disregard the current VME value and set VME equal to the VMP value. In the embodiment of routine 300 wherein VME is computed as a running average as just described, control computer 12 is preferably operable at step 308 to erase all previous VMP samples from memory 15 and store the newly computed VMP value therein as the sole VMP value. The VMP value, in this first pass through routine 300, will serve as the current VME value, and subsequent VMP values that do not deviate from VME by more than $VM_{TH}$ will be used to compute an updated VME value as described with respect to step 310. Those skilled in the art will recognize that the portion of routine 300 described thus far is advantageous in that it is operable to estimate vehicle mass as a running average of a number of computed vehicle mass samples to thereby provide a stable vehicle mass estimate under conditions wherein vehicle mass does not significantly change, yet it is also responsive to significant changes in vehicle mass to instantaneously reflect any such change in the current vehicle mass estimate.

Referring again to FIG. 7A, routine 300 may include an additional step 312, as shown in phantom, wherein control computer 12 is operable to establish a gross vehicle weight GVW as a function of the vehicle mass estimate value VME and a gravitational constant g. In one embodiment of step 312, control computer 12 is preferably operable to establish a number of vehicle weight regions, or "bins", each defining a desired range of vehicle weights. In one specific embodiment, for example, control computer 12 may be configured to establish three such bins; a first bin defining vehicle weights between 0 and 30,000 lbs, a second bin defining vehicle weights between 30,000 lbs and 50,000 lbs and a third bin defining vehicle weights in excess of 50,000 lbs. Control computer 12 is then operable to covert the vehicle mass estimate value VME to a vehicle weight value in a known manner (as a function of VME and g), and to set the gross vehicle weight parameter GVW to a weight value defined by an appropriate one of the vehicle weight bins in which the computed vehicle weight value falls. Using the above example, if control computer 12 determines that the vehicle weight value is 45,000 lbs., then it falls into the second vehicle weight bin. In one embodiment, the GVW value corresponding to each bin is preferably set to the maximum-weight value of that bin so that in the example provided, control computer 12 is operable to set GVW to 50,000 lbs. It is to be understood that the present invention contemplates providing for any number of vehicle weight bins and assigning any desired GVW values to the various bins, and that any such modifications are intended to fall within the scope of the present invention. It should also be understood that step 312 need not be included, although such a step may be useful for executing other control algorithms based, at least in part, on gross vehicle weight determinations as they may relate to whether a vehicle is running bobtail (without a trailer), with an empty trailer connected thereto, with one or more fully loaded trailers connected thereto or any combination thereof. An example of one such control algorithm in which the results of step 312 may be useful is described in co-pending U.S. application Ser. No. 09/616,752, entitled SYSTEM FOR CONTROLLING DRIVETRAIN COMPONENTS TO ACHIEVE FUEL EFFICIENCY GOALS, which is assigned to the assignee of the present invention, and the disclosure of which is incorporated herein by reference.

Figure 7B:
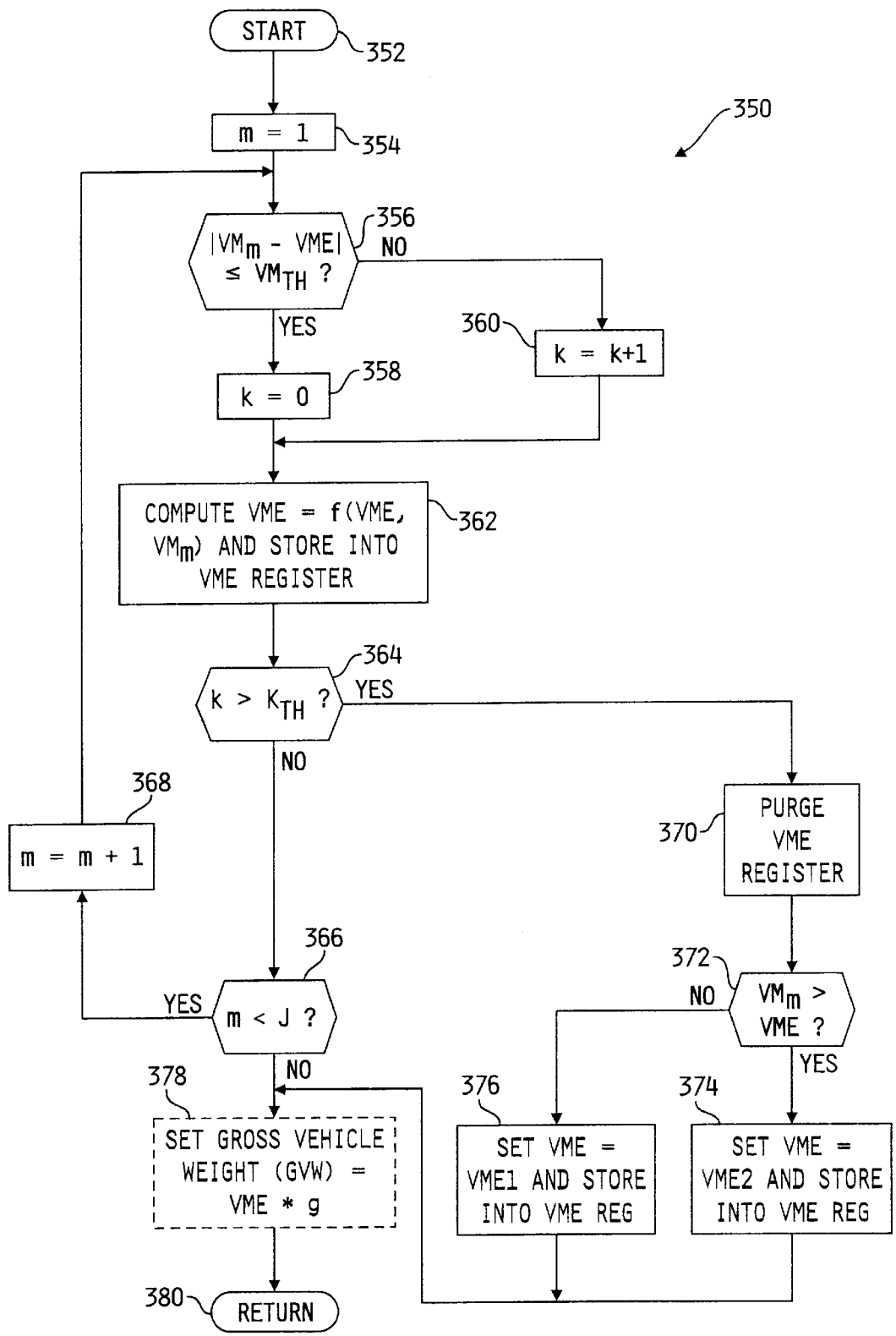
FIG. 7B is a flowchart illustrating an alternate embodiment of a software algorithm for determining a final vehicle mass estimate based oh information generated by the algorithm of FIG. 2.

Referring now to FIG. 7B, a flowchart illustrating an alternate embodiment of a software routine 350 for executing step 136 of algorithm 100, in accordance with the present invention, is shown. Routine 350 begins at step 352 and thereafter at step 354, control computer 12 is operable to reset a counter value "m" to a default value (e.g., 1). Thereafter at step 356, control computer is operable to compare one of the instantaneous vehicle mass values $VM_m$ stored in VMI register 140 to a current or existing vehicle mass estimate value VME. Preferably, control computer 12 maintains a pointer to the VMI register 140 that identifies the order in which the instantaneous vehicle mass values are processed. In one preferred embodiment, for example, control computer 12 maintains an "m" pointer to the oldest (i.e., least recent) instantaneous vehicle mass value stored in the VMI register 140. If the VMI register 140 is full, as shown by example in FIG. 2B, this pointer thus points to the location containing $VM_{i-j}$. In cases where the VMI register 140 is not full, this pointer preferably points to the oldest instantaneous vehicle mass value contained in the VMI register 140 wherever this vehicle mass value may be located within register 140. In any case, control computer 12 preferably identifies this location as the location where m=1. As the value of "m" increases in routine 350, the pointer preferably advances in incremental fashion toward the most recent instantaneous vehicle mass value stored within register 140. In this embodiment, routine 350 thus processes the instantaneous vehicle mass values consecutively from the least to most recent. Alternatively, control computer 12 may be configured to maintain the "m" pointer to the most recent instantaneous vehicle mass value within register 140 (e.g., $VM_i$ when m =1), such that routine 350 is operable to process the instantaneous vehicle mass values consecutively from the most to least recent. Those skilled in the art will recognize other known techniques for processing the various instantaneous mass values contained within the VMI register 140, and such other techniques are intended to fall within the scope of the present invention.

In any case, control computer 12 is preferably operable at step 356 to compare $VM_m$ to VME by computing an absolute value of a difference therebetween and comparing this difference to a threshold vehicle mass value $VM_{TH}$, where $VM_{TH}$ may take any of the forms described hereinabove with respect to step 306 of routine 300. If the absolute value of this difference is less than $VM_{TH}$ at step 356, routine execution advances to step 358 where control computer 12 is operable to reset another counter value "k" to a default value (e.g., zero). If, on the other hand, the absolute value of the vehicle mass difference computed at step 356 is greater than $VM_{TH}$, routine execution advances to step 360 where control computer 12 is operable to increment the "k" counter (e.g., by one). Preferably, "k" is initially reset (e.g., set to zero) prior to the very first execution of algorithm 350, and steps 358 and 360 thereafter control the value of From either of steps 358 or 360, execution of routine 350 advances to step 362 where control computer 12 is operable to compute a vehicle mass e stimate, VME, preferably as a function of the instantaneous vehicle mass value $VM_m$ and the previous (existing) VME value, and store this result into a vehicle mass estimation (VME) register within memory 15. In one embodiment, the VME register is preferably implemented as a pair of storage locations each capable of holding a predefined number of instantaneous vehicle mass samples (e.g., 1,000). As vehicle mass samples are entered into the first storage location, the vehicle mass estimate value VME is computed as a weighted average of the samples contained therein. When the first storage location becomes full, the current weighed average is transferred to the second storage location and the first storage location is then purged. New instantaneous vehicle mass samples are entered into the first storage location, and the vehicle mass estimate value VME in this case is computed as a weighted average of the instantaneous vehicle mass values contained in the first storage location and the weighted vehicle mass estimate contained in the second storage location. When the first storage location again becomes full, the second storage location is preferably purged and loaded with the weighted average of the first storage location, and so on. Those skilled in the art will recognize other known techniques for computing VME as an average, weighted or otherwise, of at least some of the instantaneous vehicle mass samples, and any such techniques are intended to fall within the scope of the present invention.

Execution of routine 350 advances from step 362 to step 364 where control computer 12 is operable to compare the current value of "k" to a threshold value $k_{TH}$. A primary purpose of the counter "k" used in routine 350 is to track the number of consecutive instantaneous vehicle mass samples $VM_m$ that exceed (or fall below) the existing vehicle mass estimate VME. In accordance with the present invention, "k" thus acts as an instantaneous measure of whether the vehicle mass has changed significantly (as defined by $VM_{TH}$) as compared with the existing vehicle mass estimate VME. In this regard, the value of $k_{TH}$ is preferably chosen to insure that a sufficient number of consecutive instantaneous vehicle mass samples have differed from VME by the amount $VM_{TH}$ to satisfactorily demonstrate that the vehicle mass has indeed changed by more than $VM_{TH}$. Preferably, $k_{TH}$ is a calibratable value, and in one embodiment is set at 60. It is to be understood, however, that $k_{TH}$ may be any positive integer, and will typically be dictated by the application of the present invention. In any case, if control computer 12 determines at step 364 that "k" is less than or equal to $k_{TH}$, execution of routine 350 advances to step 366 where control computer 12 is operable to test the counter "m" against the value, J, which is indicative of the number of instantaneous vehicle mass samples contained within the VMI register 140. If "m" is less than J, more samples exist in the VMI register 140 and routine 350 thus advances to step 368 where the value of "m" is incremented. Thereafter, routine 350 loops back to step 356 to process the next instantaneous vehicle mass sample $VM_m$ within register 140.

If, at step 364, control computer 12 determines that "k" has exceeded $k_{TH}$, this is an indication that the vehicle mass has changed from VME by at least more than $VM_{TH}$, and control computer 12 is accordingly operable at step 370 to discard the existing vehicle mass estimate VME preferably by purging the contents of the VME storage register. Thereafter at step 372, control computer 12 is operable to compare the most recent instantaneous vehicle mass sample $VM_m$ with the previous vehicle mass estimate VME. If $VM_m$ is greater than VME, control computer 12 is operable at step 374 to set the current vehicle mass estimate value VME to a default setting VME2 and to store this result into the VME storage register. If, on the other hand, control computer 12 determines at step 372 that $VM_m$ is less than or equal to VME, control computer 12 is operable at step 376 to set the current vehicle mass estimate value VME to another default setting VME1, which is preferably less than VME2, and to store this result into the VME storage register. In one embodiment, VME1 and VME2 are constants stored in memory 15, and control computer 12 is therefore operable at either of steps 374 and 376 to recall the appropriate constant from memory 15 and store this value into the VME storage register. In one embodiment, for example, VME1 is preferably chosen to reflect the weight of a so-called bobtail tractor (e.g., 30,000 lbs.), and VME2 is preferably chosen to reflect the weight of an average tractor-trailer combination (e.g., 80,000 lbs.). Alternatively, control computer 12 may be operable at either of steps 374 and 376 to compute a value for VME1 or VME2 as a function of the instantaneous vehicle mass samples contained within the VMI register 140.

In either case, the execution of routine 350 advances from either of steps 374 and 376, or from the "No" branch of step 366, to optional step 378 where control computer 12 is operable to determine a gross vehicle weight (GVW) according to any of the techniques described hereinabove with respect to step 312 of routine 300 (FIG. 7A).

From step 378, or from either of steps 374, 376 or the "No" branch of step 366 if step 378 is not included in routine 350, the execution of routine 350 advances to step 380 where routine 350 returns to its calling routine. Those skilled in the art will recognize that although the counters "m" and "k" are shown and described with respect to FIG. 7B as being advanced at steps 360 and 368 by incrementing the respective counter, this counter maintenance strategy represents only one preferred embodiment and that such counters may alternatively be configured for advancement thereof by decrementing the respective counter value without altering the scope of the present invention.

While the invention has been illustrated and described in detail in the foregoing drawings and description, the same is to be considered as illustrative and not restrictive in character, it being understood that only a preferred embodiment thereof has been shown and described and that all changes and modifications that come within the spirit of the invention are desired to be protected.

What is claimed is:

1. A system for estimating vehicle mass comprising:

a speed sensor producing a vehicle speed signal indicative of road speed of a vehicle carrying an internal combustion engine having a transmission coupled thereto;

a fuel system responsive to a fueling signal to supply fuel to said engine;

means for determining a gear ratio of said transmission; and a control circuit producing said fueling signal based on a fuel command value and determining a vehicle driving force, said control circuit computing a vehicle acceleration as a function of said vehicle speed signal and estimating a mass of said vehicle as a function of said vehicle driving force and said vehicle acceleration only if said gear ratio is between predefined high and low gear ratio values and said fueling command value is above a fueling command threshold.

2. The system of claim 1 wherein said transmission includes a number of selectable gear ratios, said predefined high gear ratio corresponding to a numerically low transmission gear and said predefined low gear ratio corresponding to a numerically higher transmission gear.

3. The system of claim 1 wherein said control circuit is operable to determine said vehicle driving force, compute said vehicle acceleration value and estimate said mass of said vehicle further conditioned upon said vehicle speed signal being between a first low road speed and a second higher road speed.

4. The system of claim 1 wherein said control circuit is operable to determine said vehicle driving force and estimate said mass of said vehicle further conditioned upon said vehicle acceleration value being above a vehicle acceleration threshold.

5. The system of claim 1 wherein said control circuit is a control computer operable to control and manage overall operation of said engine.

6. The system of claim 1 wherein said control circuit is a control computer associated with said transmission and operable to control and manage overall operation of said transmission.

7. The system of claim 1 wherein said control circuit is an auxiliary computer operable to control a vehicular feature other than overall operation of said engine and overall operation of said transmission.

8. A system for estimating vehicle mass comprising:
  a speed sensor producing a vehicle speed signal indicative of road speed of a vehicle carrying an internal combustion engine having a transmission coupled thereto;
  means for determining a gear ratio of said transmission;
  a first control computer operable to control a first apparatus carried by said vehicle, said first control computer determining a vehicle driving force, computing a vehicle acceleration as a function of said vehicle speed signal and estimating a mass of said vehicle as a function of said vehicle driving force and said vehicle acceleration only if said gear ratio is between predefined high and low gear ratio values;
  a second control computer operable to control a second apparatus carried by said vehicle, said second apparatus different that said first apparatus; and
  a communications path disposed between said first and second control computers, said first and second control computers configured to communicate information therebetween via said communications path, said information including information relating to said mass of said vehicle.

9. A method of estimating vehicle mass comprising:
  determining a road speed of a vehicle carrying an internal combustion engine coupled to a transmission;
  determining a gear ratio of said transmission;
  determining a vehicle driving force;
  computing a vehicle acceleration value as a function of said road speed; and
  estimating a mass of said vehicle as a function of said vehicle driving force and said vehicle acceleration value only if said gear ratio is between first and second predefined gear ratio values and an engine fueling command is above a fueling command threshold.

10. The method of claim 9 wherein the estimating step is further conditioned upon said road speed being between first and second predefined road speed values.

11. The method of claim 9 wherein the estimating step is further conditioned upon said vehicle acceleration value being above a vehicle acceleration threshold.

12. A system for estimating vehicle mass comprising:
  a first sensor producing a vehicle speed signal indicative of road speed of a vehicle carrying an internal combustion engine;
  a second sensor producing an engine speed signal indicative of rotational speed of said engine;
  a fuel system responsive to a fueling signal to supply fuel to said engine; and
  a control circuit producing said fueling signal and computing an engine driving force as a function thereof, said control circuit responsive to said engine speed signal to determine a first resistance force associated with at least one accessory driven by said engine and to compute a net driving force as a function of said engine driving force and said first resistance force, said control circuit determining a vehicle acceleration value as a function of said vehicle speed signal and estimating a mass of said vehicle as a function of said vehicle acceleration value and said net driving force.

13. The system of claim 12 wherein said control circuit is responsive to said vehicle speed signal and an established vehicle mass value to determine a second resistance force corresponding to a force required to overcome a rolling resistance of at least one wheel driven by said engine, said control circuit computing said net driving force further as a function of said second resistance force.

14. The system of claim 13 wherein said control circuit is responsive to said vehicle speed signal to determine a third resistance force corresponding to a force required to overcome a rotational resistance of a drivetrain driven by said engine, said control circuit computing said net driving force further as a function of said third resistance force.

15. The system of claim 14 wherein said control circuit is responsive to said vehicle speed signal to determine a fourth resistance force corresponding to a force required to overcome an aerodynamic resistance acting upon said vehicle, said control circuit computing said net driving force further as a function of said fourth resistance force.

16. The system of claim 15 wherein said control circuit is operable to compute said net driving force as a difference between said engine driving force and a sum of said first, second, third and fourth resistance forces.

17. The system of claim 12 wherein said control circuit is a control computer operable to control and manage overall operation of said engine.

18. The system of claim 12 further including a transmission coupled to said engine;
  and wherein said control circuit is a control computer associated with said transmission and operable to control and manage overall operation of said transmission.

19. The system of claim 12 wherein said control circuit is an auxiliary computer operable to control a vehicular feature other than overall operation of said engine.

20. The system of claim 12 wherein said control circuit is a first control computer operable to control a first apparatus carried by said vehicle;
  and wherein said system further includes:
    a second control computer operable to control a second apparatus carried by said vehicle, said second apparatus different that said first apparatus; and
    a communications path disposed between said first and second apparatuses, said first and second apparatuses configured to communicate information therebetween via said communications path, said information including information relating to said mass of said vehicle.

21. A method of estimating vehicle mass comprising:
  determining a road speed of a vehicle carrying an internal combustion engine;
  determining a rotational speed of said engine;
  computing a vehicle acceleration value as a function of said road speed;
  determining an engine driving force;
  determining a first resistance force as a function of said rotational speed, said first resistance force corresponding to a force required to overcome a load resistance of at least one accessory driven by said engine;
  computing a net driving force as a function of said engine driving force and said first resistance force; and
  estimating a mass of said vehicle as a function of said vehicle acceleration value and said net driving force.

22. The method of claim 21 further including the step of determining a second resistance force as a function of said road speed and of an established vehicle mass value, said second resistance force corresponding to a force required to overcome a rolling resistance of at least one wheel driven by said engine;
  wherein the step of computing said net driving force includes computing said net driving force as a function of said second resistance force.

23. The method of claim 22 further including the step of determining a third resistance force as a function of said road speed, said third resistance force corresponding to a force required to overcome a rotational resistance of a drivetrain driven by said engine;
  wherein the step of computing said net driving force includes computing said net driving force as a function of said third resistance force.

24. The method of claim 23 further including the step of determining a fourth resistance force as a function of said road speed, said fourth resistance force corresponding to a force required to overcome an aerodynamic force acting upon said vehicle;
  wherein the step of computing said net driving force includes computing said net driving force as a function of said fourth resistance force.

25. A The method of claim 24 wherein the step of computing said net driving force includes computing said net driving force as a difference between said engine driving force and a sum of said first, second, third and fourth resistance forces.

26. A system for estimating vehicle mass comprising:
  a speed sensor producing a vehicle speed signal indicative of road speed of a vehicle carrying an internal combustion engine; and
  a control circuit responsive to said vehicle speed signal to compute a vehicle acceleration value, said control circuit responsive to said vehicle acceleration value exceeding an acceleration threshold to execute a data collection sequence by periodically computing instantaneous vehicle mass values as functions of instantaneous vehicle driving force and vehicle acceleration value pairs, and to said vehicle acceleration value dropping below said acceleration threshold to terminate said data collection sequence, said control circuit estimating a vehicle mass value as a function of only instantaneous vehicle mass values computed near termination of said data collection sequence.

27. The system of claim 26 wherein said control circuit is configured such that execution of said data collection sequence is further conditioned upon said vehicle speed signal being between a first road speed value and a second higher road speed value.

28. The system of claim 27 wherein said control circuit is configured to terminate said data collection sequence if said vehicle speed signal drops below said first road speed value or exceeds said second higher road speed value.

29. The system of claim 26 further including means for determining a current gear ratio of a transmission coupled to said engine;
  wherein said control circuit is configured such that execution of said data collection sequence is further conditioned upon said current gear ratio being between a first gear ratio value and a second higher gear ratio value.

30. The system of claim 29 wherein said control circuit is configured to terminate said data collection sequence if said current gear ratio indicates an out-of-gear condition.

31. The system of claim 26 further including a fuel system responsive to a fueling signal to supply fuel to said engine;
  wherein said control circuit is configured such that execution of said data collection sequence is further conditioned upon a fueling command corresponding to said fueling signal being greater than a fueling command threshold.

32. The system of claim 31 a wherein said control circuit is configured to terminate said data collection sequence if said fueling command drops below said fueling command threshold.

33. The system of claim 26 wherein said control circuit is a control computer operable to control and manage overall operation of said engine.

34. The system of claim 26 further including a transmission coupled to said engine;
  and wherein said control circuit is a control computer associated with said transmission and operable to control and manage overall operation of said transmission.

35. The system of claim 26 wherein said control circuit is an auxiliary computer operable to control a vehicular feature other than overall operation of said engine.

36. The system of claim 26 wherein said control circuit is a first control computer operable to control a first apparatus carried by said vehicle;
  and wherein said system further includes:
    a second control computer operable to control a second apparatus carried by said vehicle, said second apparatus different that said first apparatus; and
    a communications path disposed between said first and second apparatuses, said first and second apparatuses configured to communicate information therebetween via said communications path, said information including information relating to said mass of said vehicle.

37. A method of estimating vehicle mass comprising:
  determining a road speed of a vehicle carrying an internal combustion engine;
  computing a vehicle acceleration value as a function of said road speed;
  executing a data collection sequence by periodically computing instantaneous vehicle mass values as functions of instantaneous vehicle driving force and vehicle acceleration pairs if said vehicle acceleration value exceeds a vehicle acceleration threshold;
  terminating said data collection sequence if said vehicle acceleration value drops below said vehicle acceleration threshold; and
  estimating a vehicle mass value as a function of only a subset of said instantaneous vehicle mass values computed near termination of said data collection sequence.

38. The method of claim 37 wherein the executing step is further conditioned upon said road speed being between a first road speed value and a second greater road speed value.

39. The method of claim 37 wherein the terminating step includes terminating said data collection sequence if said road speed value drops below said first road speed value or exceeds said second greater road speed value.

40. The method of claim 37 further including the step of determining a current gear ratio of a transmission coupled to said engine;

wherein the executing step is further conditioned upon said current gear ratio being between a first gear ratio value and a second greater gear ratio value.

41. The method of claim 40 wherein the terminating step includes terminating said data collection sequence if said current gear ratio indicates an out-of-gear condition.

42. The method of claim 37 further including the step of producing a fueling command for supplying a corresponding amount of fuel to said engine;

wherein the executing step is further conditioned upon said fueling command exceeding a fueling command threshold.

43. The method of claim 42 wherein the terminating step further includes terminating said data collection sequence if said fueling command falls below said fueling command threshold.

44. A system for estimating vehicle mass comprising:

a sensor producing a vehicle speed signal indicative of road speed of a vehicle carrying an internal combustion engine having a transmission coupled thereto; and a control circuit determining a vehicle driving force, computing a vehicle acceleration as a function of said vehicle speed signal and computing an instantaneous vehicle mass value as a function of said vehicle drive force and said vehicle acceleration, said control circuit monitoring said vehicle speed signal and said transmission and estimating a vehicle-mass value as a function of said instantaneous vehicle mass value only if said road speed changes less than a road speed change amount during a subsequent transmission gear shift.

45. The system of claim 44 wherein said control circuit is operable to determine whether said road speed changes less than said road speed change amount by computing a difference in said road speed during said gear shift and comparing said difference to upper and lower difference limits, said road speed changing less than said road speed change amount if said difference is between said upper and lower difference limits.

46. The system of claim 45 wherein said control circuit is configured to disregard said instantaneous vehicle mass value if said difference exceeds said upper difference value or falls below said lower difference value.

47. The system of claim 46 further including means for determining a currently engaged gear ratio of said transmission;

and wherein said control circuit is operable to monitor said currently engaged gear ratio and compute said difference in road speed when said currently engaged gear ratio indicates an out-of-gear condition pursuant to said gear shift.

48. The system of claim 47 wherein said control circuit is configured to determine a first road speed value upon detection of said out-of-gear condition, and to determine a second road speed value upon detection of a first to occur of a confirmation of engagement of a next transmission gear and an expiration of a predefined time interval since determining said first road speed value, said control circuit computing said difference in road speed as a difference between said first and second road speed values.

49. The system of claim 44 further including a memory having said road speed change amount stored therein.

50. The system of claim 44 wherein said control circuit is configured to determine said road speed change amount as a function of said vehicle acceleration prior to said gear shift.

51. The system of claim 44 wherein said control circuit is a control computer operable to control and manage overall operation of said engine.

52. The system of claim 44 further including a transmission coupled to said engine;

and wherein said control circuit is a control computer associated with said transmission and operable to control and manage overall operation of said transmission.

53. The system of claim 44 wherein said control circuit is an auxiliary computer operable to control a vehicular feature other than overall operation of said engine.

54. The system of claim 44 wherein said control circuit is a first control computer operable to control a first apparatus carried by said vehicle;

and wherein said system further includes:

a second control computer operable to control a second apparatus carried by said vehicle, said second apparatus different that said first apparatus; and a communications path disposed between said first and second apparatuses, said first and second apparatuses configured to communicate information therebetween via said communications path, said information including information relating to said mass of said vehicle.

55. A system for estimating vehicle mass comprising:

a sensor producing a vehicle speed signal indicative of road speed of a vehicle carrying an internal combustion engine having a transmission coupled thereto; and a control circuit determining a vehicle driving force, computing a vehicle acceleration as a function of said vehicle speed signal and estimating a vehicle mass value as a function of said vehicle driving force and said vehicle acceleration, said control circuit monitoring said vehicle speed signal and said transmission and disregarding said vehicle mass value if said road speed changes more than a road speed change amount during a subsequent transmission gear shift.

56. The system of claim 55 wherein said control circuit is operable to determine whether said road speed changes less than said road speed change amount by computing a difference in said road speed during said gear shift and comparing said difference to upper and lower difference limits, said road speed changing more than said road speed change amount if said difference is above said upper difference limit or below said lower difference limit.

57. The system of claim 56 further including means for determining a currently engaged gear ratio of said transmission;

and wherein said control circuit is operable to monitor said currently engaged gear ratio and compute said difference in road speed when said currently engaged gear ratio indicates an out-of-gear condition pursuant to said gear shift.

58. The system of claim 57 wherein said control circuit is configured to determine a first road speed value upon detection of said out-of-gear condition, and to determine a second road speed value upon detection of a first to occur of a confirmation of engagement of a next transmission gear and an expiration of a predefined time interval since determining said first road speed value, said control circuit computing said difference in road speed as a difference between said first and second road speed values.

59. The system of claim 55 further including a memory having said road speed change amount stored therein.

60. The system of claim 55 wherein said control circuit is configured to determine said road speed change amount as a function of said vehicle acceleration prior to said gear shift.

61. The system of claim 55 wherein said control circuit is a control computer operable to control and manage overall operation of said engine.

62. The system of claim 55 further including a transmission coupled to said engine;
and wherein said control circuit is a control computer associated with said transmission and operable to control and manage overall operation of said transmission.

63. The system of claim 55 wherein said control circuit is an auxiliary computer operable to control a vehicular feature other than overall operation of said engine.

64. The system of claims 55 wherein said control circuit is a first control computer operable to control a first apparatus carried by said vehicle;
and wherein said system further includes:
a second control computer operable to control a second apparatus carried by said vehicle, said second apparatus different that said first apparatus; and
a communications path disposed between said first and second apparatuses, said first and second apparatuses configured to communicate information therebetween via said communications path, said information including information relating to said mass of said vehicle.

65. A method of estimating vehicle mass comprising:
sensing road speed of a vehicle carrying an internal combustion engine having a transmission coupled thereto;
determining a vehicle driving force;
computing a vehicle acceleration value as a function of said road speed;
computing an instantaneous vehicle mass value as a function of said vehicle driving force and said vehicle acceleration value;
monitoring said road speed during a gear shift of said transmission subsequent to computing said instantaneous vehicle mass value; and
estimating a vehicle mass value as a function of said instantaneous vehicle mass value if said road speed changes less than a road speed change amount during said gear shift.

66. The method of claim 65 wherein the step of estimating a vehicle mass value includes:
determining a first road speed value upon detection of an out-of-gear condition pursuant to said gear shift;
determining a second road speed value upon detection of a first to occur of a confirmation of engagement of a next gear of said transmission and expiration of a predefined time interval since determining said first road speed value;
computing a difference between said first and second road speed values; and
determining that said road speed changes less than said road speed change amount if said difference is above a first difference limit or below a second higher difference limit.

67. The method of claim 65 wherein the estimating step includes recalling said road speed change amount from a memory unit.

68. The method of claim 65 further including the step of determining said road speed change amount as a function of said vehicle acceleration prior to said gear shift.

69. A method of estimating vehicle mass comprising:
sensing road speed of a vehicle carrying an internal combustion engine having a transmission coupled thereto;
determining a vehicle driving force;
computing g a vehicle acceleration value as a function of said road speed;
estimating a vehicle mass value as a function of said vehicle driving force and said vehicle acceleration value;
monitoring said road speed during a gear shift of said transmission subsequent to estimating said vehicle mass value; and
disregarding said vehicle mass value if said road speed changes more than a road speed change amount during said gear shift.

70. The method of claim 69 wherein the disregarding step includes:
determining a first road speed value upon detection of an out-of-gear condition pursuant to said gear shift;
determining a second road speed value upon detection of a first to occur of a confirmation of engagement of a next gear of said transmission and expiration of a predefined time interval since determining said first road speed value;
computing a difference between said first and second road speed values; and
determining that said road speed changes more than said road speed change amount if said difference is below a first difference limit or above a second higher difference limit.

71. The method of claim 69 wherein the estimating step includes recalling said road speed change amount from a memory unit.

72. The method of claim 69 further including the step of determining said road speed change amount as a function of said vehicle acceleration prior to said gear shift.

73. A system for estimating vehicle mass comprising:
a speed sensor producing a vehicle speed signal indicative of a road speed of a vehicle carrying an internal combustion engine; and
a control circuit determining a vehicle driving force, computing a vehicle acceleration as a function of said vehicle speed signal and estimating a vehicle mass value as a function of said vehicle driving force and said vehicle acceleration, said control circuit combining said vehicle mass value with an existing vehicle mass estimate if a difference therebetween is less than a difference value.

74. The system of claim 73 wherein said control circuit includes a memory having said existing vehicle mass estimate stored therein, said control circuit configured to combine said vehicle mass value with said existing vehicle mass estimate by incorporating said vehicle mass value into said existing vehicle mass estimate.

75. The system of claim 73 wherein said control circuit is configured to estimate a plurality of vehicle mass values as functions of corresponding vehicle driving force and vehicle acceleration values, said control computer replacing said existing vehicle mass estimate with an updated vehicle mass estimate if differences between a number of consecutive ones of said plurality of vehicle mass values and said existing vehicle mass estimate are greater than said difference value.

76. The system of claim 75 further including a memory unit, said updated vehicle mass estimate stored in said memory unit.

77. The system of claim 76 wherein said updated mass estimate corresponds to a first vehicle mass value if said number of consecutive ones of said plurality of vehicle mass values are less than said existing vehicle mass estimate.

78. The system of claim 77 wherein said updated mass estimate corresponds to a second vehicle mass value greater than said first vehicle mass value if said number of consecutive ones of said plurality of vehicle mass values are greater than said existing vehicle mass estimate.

79. The system of claim 75 wherein said control computer is operable to determine said updated vehicle mass estimate as a function of at least some of said number of consecutive ones of said plurality of vehicle mass values.

80. The system of claim 73 wherein said control circuit is a control computer operable to control and manage overall operation of said engine.

81. The system of claim 73 further including a transmission coupled to said engine;

and wherein said control circuit is a control computer associated with said transmission and operable to control and manage overall operation of said transmission.

82. The system of claim 73 wherein said control circuit is an auxiliary computer operable to control a vehicular feature other than overall operation of said engine.

83. The system of claim 73 wherein said control circuit is a first control computer operable to control a first apparatus carried by said vehicle;

and wherein said system further includes:
a second control computer operable to control a second apparatus carried by said vehicle, said second apparatus different that said first apparatus; and
a communications path disposed between said first and second apparatuses, said first and second apparatuses configured to communicate information therebetween via said communications path, said information including information relating to said mass of said vehicle.

84. A system for estimating vehicle mass comprising:

a speed sensor producing a vehicle speed signal indicative of a road speed of a vehicle carrying an internal combustion engine; and
a control circuit determining a plurality of vehicle driving force values, computing a corresponding plurality of vehicle acceleration values as a function of said vehicle speed signal and estimating a corresponding plurality of vehicle mass values as functions of said plurality of vehicle driving force and vehicle acceleration values, said control circuit establishing an updated vehicle mass estimate if differences between a consecutive number of said plurality of vehicle mass values and an existing vehicle mass estimate exceed a difference value.

85. The system of claim 84 further including a memory unit, said updated vehicle mass estimate stored in said memory unit.

86. The system of claim 85 wherein said updated mass estimate corresponds to a first vehicle mass value if said number of consecutive ones of said plurality of vehicle mass values are less than said existing vehicle mass estimate.

87. The system of claim 86 wherein said updated mass estimate corresponds to a second vehicle mass value greater than said first vehicle mass value if said number of consecutive ones of said plurality of vehicle mass values are greater than said existing vehicle mass estimate.

88. The system of claim 84 wherein said control computer is operable to determine said updated vehicle mass estimate as a function of at least some of said number of consecutive ones of said plurality of vehicle mass values.

89. The system of claim 84 wherein said control circuit is a control computer operable to control and manage overall operation of said engine.

90. The system of claim 84 further including a transmission coupled to said engine;

and wherein said control circuit is a control computer associated with said transmission and operable to control and manage overall operation of said transmission.

91. The system of claim 84 wherein said control circuit is an auxiliary computer operable to control a vehicular feature other than overall operation of said engine.

92. The system of claim 86 wherein said control circuit is a first control computer operable to control a first apparatus carried by said vehicle;

and wherein said system further includes:
a second control computer operable to control a second apparatus carried by said vehicle, said second apparatus different that said first apparatus; and
a communications path disposed between said first and second apparatuses, said first and second apparatuses configured to communicate information therebetween via said communications path, said information including information relating to said mass of said vehicle.

93. A method of estimating vehicle mass comprising:

sensing a plurality of road speed values of a vehicle carrying an internal combustion engine;
computing a corresponding plurality of vehicle acceleration values as functions of said plurality of road speed values;
determining a corresponding plurality of vehicle drive force values;
estimating a corresponding plurality of vehicle mass values each as a function of corresponding ones of said plurality of vehicle acceleration and vehicle drive force values;
comparing said plurality of vehicle mass values with an existing vehicle mass estimate; and
combining said plurality of vehicle mass values with said existing vehicle mass estimate if differences between said plurality of vehicle mass values and said existing vehicle mass estimate are less than a difference value.

94. A method of estimating vehicle mass comprising:

sensing a plurality of road speed values of a vehicle carrying an internal combustion engine;
computing a corresponding plurality of vehicle acceleration values as functions of said plurality of road speed values;
determining a corresponding plurality of vehicle drive force values;
estimating a corresponding plurality of vehicle mass values each as a function of corresponding ones of said plurality of vehicle acceleration and vehicle drive force values;
comparing said plurality of vehicle mass values with an existing vehicle mass estimate; and
replacing said existing vehicle mass estimate with an updated vehicle mass estimate if differences between a number of said plurality of vehicle mass values and said existing vehicle mass estimate are greater than a difference value.

* * * * *

UNITED STATES PATENT AND TRADEMARK OFFICE
CERTIFICATE OF CORRECTION

PATENT NO. : 6,567,734 B2
DATED : May 20, 2003
INVENTOR(S) : Steven M. Bellinger et al.

It is certified that error appears in the above-identified patent and that said Letters Patent is hereby corrected as shown below:

Column 5,
Line 19, please delete "oh" and replace with -- on --.

Column 11,
Line 14, please delete "$VA_{TH}$," and insert -- $VA_{TH}.$ --.

Column 14,
Line 62, please delete "$Vm_{i-j}$," and insert -- $Vm_{i-J}.$ --.

Column 20,
Line 58, please delete "o".

Column 22,
Line 28, please delete "$Vm_{i-j}$," and insert -- $Vm_{i-J}.$ --.
Line 64, please insert -- k. -- after "of".
Line 64, please insert new paragraph beginning with "From either…".
Line 67, please delete "e stimate," and insert -- estimate, --.

Signed and Sealed this

Fourth Day of November, 2003

JAMES E. ROGAN
*Director of the United States Patent and Trademark Office*